United States Patent
Park et al.

(10) Patent No.: US 12,022,444 B2
(45) Date of Patent: Jun. 25, 2024

(54) WIRELESS COOPERATIVE CHARGING SYSTEM AND METHOD FOR INCREASING POWER RECEIVING EFFICIENCY DURING SIMULTANEOUS INFORMATION AND POWER TRANSFER

(71) Applicant: Korea Electronics Technology Institute, Seongnam-si (KR)

(72) Inventors: Yong Ju Park, Goyang-si (KR); Yong Seok Lim, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 479 days.

(21) Appl. No.: 17/468,563

(22) Filed: Sep. 7, 2021

(65) Prior Publication Data

US 2022/0078790 A1  Mar. 10, 2022

(30) Foreign Application Priority Data

Sep. 7, 2020  (KR) .................. 10-2020-0114163
Nov. 26, 2020 (KR) .................. 10-2020-0161633

(51) Int. Cl.
*H04W 72/0446*  (2023.01)
*H02J 50/20*  (2016.01)
(Continued)

(52) U.S. Cl.
CPC ......... *H04W 72/0446* (2013.01); *H02J 50/20* (2016.02); *H02J 50/40* (2016.02);
(Continued)

(58) Field of Classification Search
None
See application file for complete search history.

(56) References Cited

U.S. PATENT DOCUMENTS 9,219,385 B2  12/2015 Kim et al.
2012/0214536 A1*  8/2012 Kim .................. H02J 7/00034
455/522

FOREIGN PATENT DOCUMENTS

KR  10-2018-0044369 A  5/2018
KR  10-2018-0076822 A  7/2018
(Continued)

OTHER PUBLICATIONS

"Residual Energy Estimation-Based MAC Protocol for Wireless Powered Sensor Networks", Sensors (Basel) 7617, Lee, Kwon, Kim, PMCID: PMC8624648, PMID: 34833689 (Year: 2021).*
(Continued)

*Primary Examiner* — Walter J DiVito
(74) *Attorney, Agent, or Firm* — Knobbe Martens Olson & Bear LLP

(57) ABSTRACT

Provided is a power transmission and reception system and a power transmission and reception system method capable of simultaneously transmitting/receiving data and power and including an array antenna including a plurality of antennas, a radio frequency (RF) unit and a baseband unit provided for data transmission and reception, a slot allocation unit configured to allocate a channel for power transfer and a slot for data transmission in a Contention Access Period (CAP) section, and allocate a slot for power transfer in consideration of whether to perform cooperative charging with a nearby another Simultaneous Wireless Information and Power Transfer (SWIPT) power transfer system, and a power supply and beamforming control unit configured to adjust the array antenna such that a power signal to be transmitted is beamformed according to a positioning beacon from a power receiving unit (PRU).

15 Claims, 22 Drawing Sheets

(51) Int. Cl.
  *H02J 50/40*  (2016.01)
  *H02J 50/80*  (2016.01)
  *H02J 50/90*  (2016.01)
  *H04B 7/06*   (2006.01)
  *H04W 74/04*  (2009.01)

(52) U.S. Cl.
  CPC .............. *H02J 50/80* (2016.02); *H02J 50/90* (2016.02); *H04B 7/0617* (2013.01); *H04W 74/04* (2013.01)

(56)    References Cited

FOREIGN PATENT DOCUMENTS

| KR | 10-1936019 B    | 12/2018 |
| KR | 10-2020-0066560 A | 6/2020 |
| KR | 10-2136146 B1   | 7/2020 |

OTHER PUBLICATIONS

KR Office Action dated Nov. 16, 2022, of the corresponding Korean Patent application 2020-0161633.

* cited by examiner

PRU#2 REQUESTS PTU#1 TO ALLOCATE POWER GTS TO OWN POWER CHANNEL (#20)

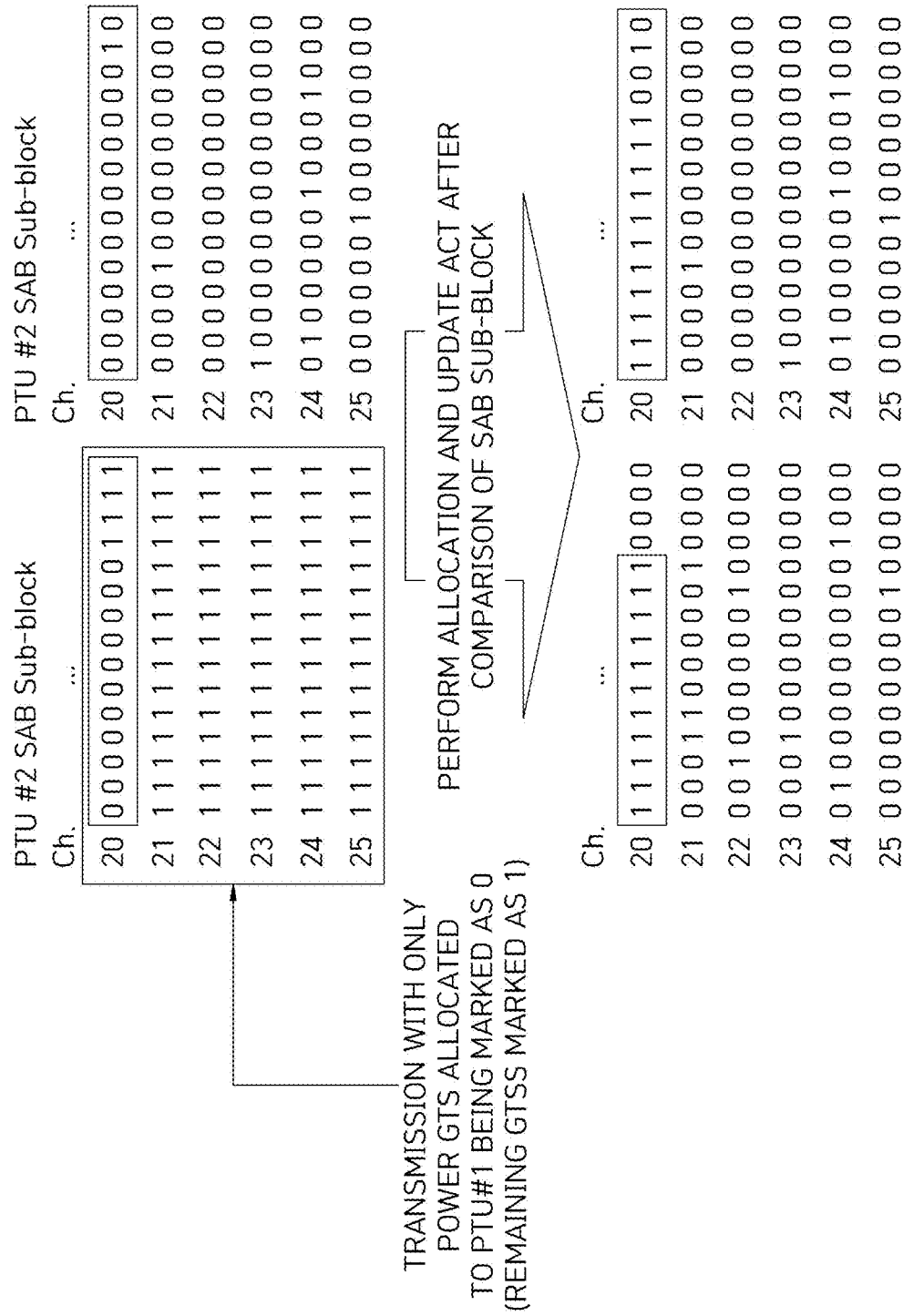

⑥ PTU#3: MASTER BEACON (MB) TRANSMISSION
->ALLOWED TO REQUEST COOPERATIVE CHARGING
(EXISTENCE OF PTUS ADJACENT TO PARENT PTU)

⑦ PTU#2: COOPERATIVE CHARGING REQ/RESP/NOTIFY
->DISAPPROVED

FIG. 11

DEFINITION OF TWO MAC COMMANDS FOR COOPERATIVE CHARGING

| Command ID | Command name | RFD | | Subetause |
|---|---|---|---|---|
| | | TX | RX | |
| 0x25-0x28 | Reserved | | | |
| 0x29 | DSME-SWIPT GTS Request command | | | |
| 0x2A | DSME-SWIPT GTS Response command | | | |
| 0x2B | DSME-SWIPT GTS Notify command | | | |
| 0x2C | DSME-SWIPT Positiong command | | | |
| 0x2D | Cooperative Charging Request command | | | |
| 0x2E | Cooperative Charging Response command | | | |
| 0x2F-0xFF | Reserved | | | |

| 0x25-0xff | Reserved |
|---|---|
| | |
| | |
| | |
| | ... |

WIRELESS COOPERATIVE CHARGING SYSTEM AND METHOD FOR INCREASING POWER RECEIVING EFFICIENCY DURING SIMULTANEOUS INFORMATION AND POWER TRANSFER

CROSS-REFERENCE TO RELATED APPLICATION

This application claims priority to and the benefit of Korean Patent Application Nos. 10-2020-0114163, filed on Sep. 7, 2020 and 10-2020-0161633, filed on Nov. 26, 2020, the disclosures of which are incorporated herein by reference in its entirety.

BACKGROUND

1. Field

The described technology relates to wireless power transfer.

2. Discussion of Related Art

As the Internet of Things (IoT) has become common in various fields for monitoring and control of surrounding environments and expanded on a large scale, a large number of sensor devices are being used everywhere, and in terms of the supply of power, there is an increasing need for lifetime extension methods other than constant power and auxiliary batteries. Recently, as the lifetime extension methods other than constant power and auxiliary batteries, wireless charging technology has been incorporated.

However, since wireless charging technology using a radio frequency (RF) has low transmission efficiency, there is a need for a method of increasing charging efficiency. The disclosure of this section is to provide background information relating to the present disclosure. Applicant does not admit that any information contained in this section constitutes prior art.

SUMMARY

The described technology provides power transfer technology capable of enhancing the efficiency of data/power data transmission and reception of the existing power receiving device (mobile phones/wearable devices, sensors, bikes, automobiles, etc.) by applying cooperative charging to wireless power transfer.

The described technology also suggests technology required by multiple power transmitting units (PTU) to transfer power to one or more power receiving units (PRU) and suggests a scheduling scheme that supports data transmission and reception between different PRUs.

The technical aspects of the described technology are not limited to the above, and other aspects may become apparent to those of ordinary skill in the art based on the following description.

According to one aspect of the described technology, there is provided a Simultaneous Wireless Information and Power Transfer (SWIPT) power transfer system including an array antenna including a plurality of antennas, a radio frequency (RF) unit and a baseband unit provided for data transmission and reception, a slot allocation unit configured to allocate a channel for power transfer and a slot for data transmission in a Contention Access Period (CAP) section and allocate a slot for power transfer in consideration of whether to perform cooperative charging with a nearby another SWIPT power transfer system, and a power supply and beamforming control unit configured to adjust the array antenna such that a power signal to be transmitted is beamformed according to a positioning beacon from a power receiving unit (PRU).

The slot allocation unit may transmit a master beacon signal in the CAP section, and the master beacon signal may be a signal obtained by adding a new Header information element (IE) to an existing master beacon structure for formation of Distributed Synchronous Multichannel Extension (DSME)-SWIPT personal area network (PAN) coordination and defining a DSME-SWIPT PAN descriptor IE value in the Header IE.

The slot allocation unit may perform a Guaranteed Time Slot (GTS)-handshaking with the PRU during the CAP section to allocate the slot for power transfer and the slot for data transmission in a Contention Free Period (CFP) section, and the CFP section may be a section including a plurality of time slots divided by different frequencies and times to allow simultaneous transmission of power and data.

The slot allocation unit, in response to receiving a cooperative charging request command from the PRU, may determine whether to approve cooperative charging and transmits a cooperative charging response command including a result of the determination, and the cooperative charging request command may include Guaranteed Time Slot (GTS) information previously allocated to the PRU.

In addition, the link quality of the channel may be checked to dynamically switch and allocate a channel of the GTS for WPT in the CAP section, a transfer channel list may be maintained and updated for channel adaptation, and details of the above may be shared with a power reception system during the CAP section, and a DSME scheme specified in IEEE802.15.4-2015 is conformed and improved to schedule the timeslot of the CFP section.

The power supply and beamforming control unit, in response to the positioning beacon being received from at least one of a first slot of the CFP section and a first slot among GTSs allocated for wireless power transfer, may adjust the array antenna on the basis of a transmission direction of the positioning beacon to transmit power in a beamforming method to a side from which the positioning beacon is received.

According to another aspect of the described technology, there is provided a Simultaneous Wireless Information and Power Transfer (SWIPT) power reception system including: an antenna configured to receive at least one of data and power; a radio frequency (RF) unit and a base band unit provided for data transmission and reception; a communication control unit configured to proceed with Distributed Synchronous Multichannel Extension Simultaneous Wireless Information and Power Transfer Guaranteed Time Slot (DSME SWIPT GTS)-handshaking, generate a Positioning Beacon (PB) signal for requesting power, and request cooperative charging; and a power storage unit configured to store the received power.

The communication control unit, in response to receiving a beacon signal from a power transmitting unit (PTU) different from a PTU having performed the GTS handshaking, may transmit a cooperative charging request command including GTS information allocated through the GTS-handshaking to the different PTU to request cooperative charging.

According to another aspect of the described technology, there is provided a Simultaneous Wireless Information and Power Transfer (SWIPT) power transfer method including:

transmitting, by a power transfer system, a master beacon signal that reaches a predetermined area; initiating, in response to a power reception system within the predetermined area receiving the master beacon signal, SWIPT Guaranteed Time Slot (GTS)-handshaking; allocating respective GTSs for transmitting power and data while proceeding with the handshaking; performing power transfer and reception in the allocated GTS; requesting, in response to the power reception system receiving a beacon signal different from the master beacon signal, a cooperative charging request command; determining, by a different power transfer system having received the cooperative charging request command, whether to perform cooperative charging; and when the cooperative charging is performable, transferring power by the transfer system and the different transfer system in cooperation with each other.

The allocating of the slot may include: transmitting, by the power reception system, a SWIPT request signal; allocating, by the power transfer system having received the SWIPT request signal, a slot usable by each of the power transfer systems in consideration of one or more of the SWIPT request signal and a channel status, and transmitting a SWIPT response signal including data regarding the allocation; and broadcasting a SWIPT notification signal confirming that the power reception system having received the SWIPT response signal has joined a SWIPT system.

The cooperative charging request command may include information about the allocated GTS, and the different power transfer system may determine whether to perform cooperative charging by determining whether at least a part of a time slot corresponding to the received cooperative charging request command is available.

BRIEF DESCRIPTION OF THE DRAWINGS

The above and other aspects, features and advantages of the described technology will become more apparent to those of ordinary skill in the art by describing embodiments thereof in detail with reference to the accompanying drawings, in which:

FIGS. 8A-8C, 9A-9C and 10A-10C are diagrams illustrating an operation flow of distributed cooperative charging and multi-superframes and slot allocation bitmap (SAB) sub-blocks in each operation according to an embodiment of the described technology;

FIG. 11 is a new MAC command information table for cooperative charging according to an embodiment of the described technology;

DETAILED DESCRIPTION OF EMBODIMENTS

Figure 1:
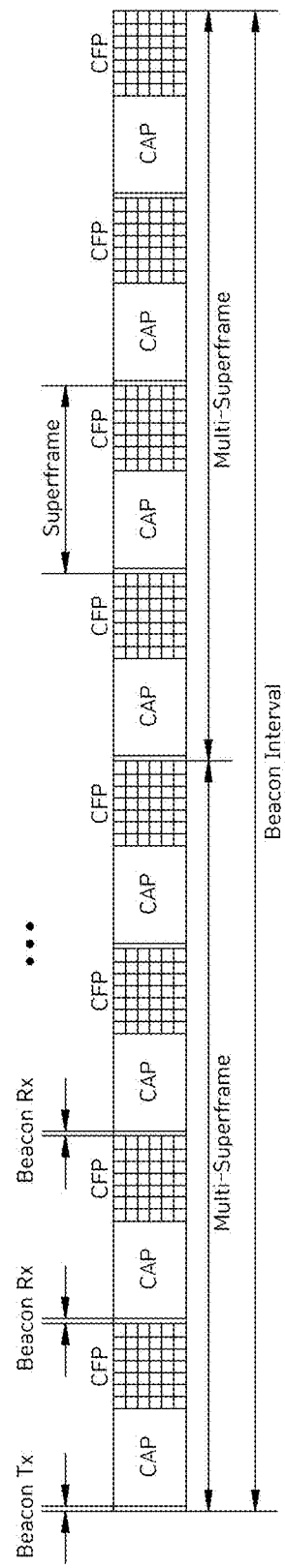
FIG. 1 is a diagram illustrating an example IEEE 802.15.4e ZigBee Distributed Synchronous Multichannel Extension (DSME) communication superframe structure.

The aspects and effects of the described technology are not limited to the above, and the aspects, effects, and ways of achieving them will become readily apparent with reference to descriptions of the following detailed embodiments in conjunction with the accompanying drawings.

The described technology relates to a method of transferring power from a power transmitting terminal to a power receiving terminal using multiple channels while transmitting and receiving data between multiple receiving devices, thereby simultaneously performing efficient low-power wireless communication and power transfer in a network including a plurality of receiving terminals and transferring power by avoiding congested channels.

According to an embodiment of the described technology, a technology for changing a specific channel and Guaranteed Time Slot (GTS) by calculating a channel congestion degree when performing power transfer while conforming to the Distributed Synchronous Multichannel Extension (DSME) scheme proposed by IEEE 802.15.4-2015 is provided.

In the DSME method, multiple timeslots are allocated to multiple channels for data transmission and reception of each device. In order for multiple receiving terminals to receive power from one power transmitting terminal, appropriate scheduling is required. The described technology proposes a method of switching a channel during power transfer to improve efficiency when a single or multiple receiving terminals receive power from a single power transmitting terminal through a plurality of channels and transmit and receive data while transmitting and receiving data between multiple receiving terminals.

Hereinafter, a configuration of the described technology will be described in detail with reference to the accompanying drawings.

In the description of the described technology, a detailed description of related known functions or constructions will be omitted to avoid obscuring the subject matter of the described technology. In addition, the scope of the described technology is not limited to such embodiments, and the described technology may be embodied in various forms. The embodiments to be described below are embodiments provided only to complete the disclosure of the described technology and assist those skilled in the art in fully understanding the scope of the described technology. The described technology is defined only by the scope of the appended claims.

The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In addition, as used herein, the terms "unit", "~apparatus", "~device", "~part" or "~module" may refer to a unit that performs at least one function or operation and may be implemented in hardware, software, or a combination of hardware and software.

On the other hand, in each embodiment of the described technology, each component, functional blocks or means may include one or more sub-components, and the electric, electronic, and mechanical functions performed by each component may be implemented by various known devices or mechanical elements, such as electronic circuits, integrated circuits, application Specific Integrated Circuits (ASICs), etc., which may be implemented separately or two or more of which may be integrated into one.

FIG. 1 is a diagram illustrating an example of the existing superframe structure (an IEEE 802.15.4e ZigBee DSME communication superframe structure). Referring to FIG. 1, the existing superframe includes a beacon, a contention access period (CAP) section, and a contention free period (CFP) section.

When a master (a personal area network (PAN) coordinator) transmits a signal for accommodating a target to communicate with the master and other nodes in a network, that is, a beacon signal for network formation, slaves adjacent to the master receive the beacon signal. The slaves receiving the beacon signal are assigned slots within the CFP section through Guaranteed Time Slot-handshaking (GTS handshaking) during the CAP section. During the GTS-handshaking process, the slave transmits slot assignment requests and the master checks the slot assignment request and broadcasts a response. The slaves, upon receiving the response, notify surroundings of the result of slots allocated thereto in a broadcasting manner.

The slave communicates in the slot section allocated to the CFP section. As shown in FIG. 1, the CFP section is divided into a total of sixteen channels and seven time slots per channel, and each slave may perform a data transmission/reception process in the allocated slots. The superframe is repeated over time, and multiple superframes exist according to a set value during one beacon interval, that is, a period of time from a point in time when the master transmits a beacon to a point in time when the master transmits the next beacon.

Figure 2:
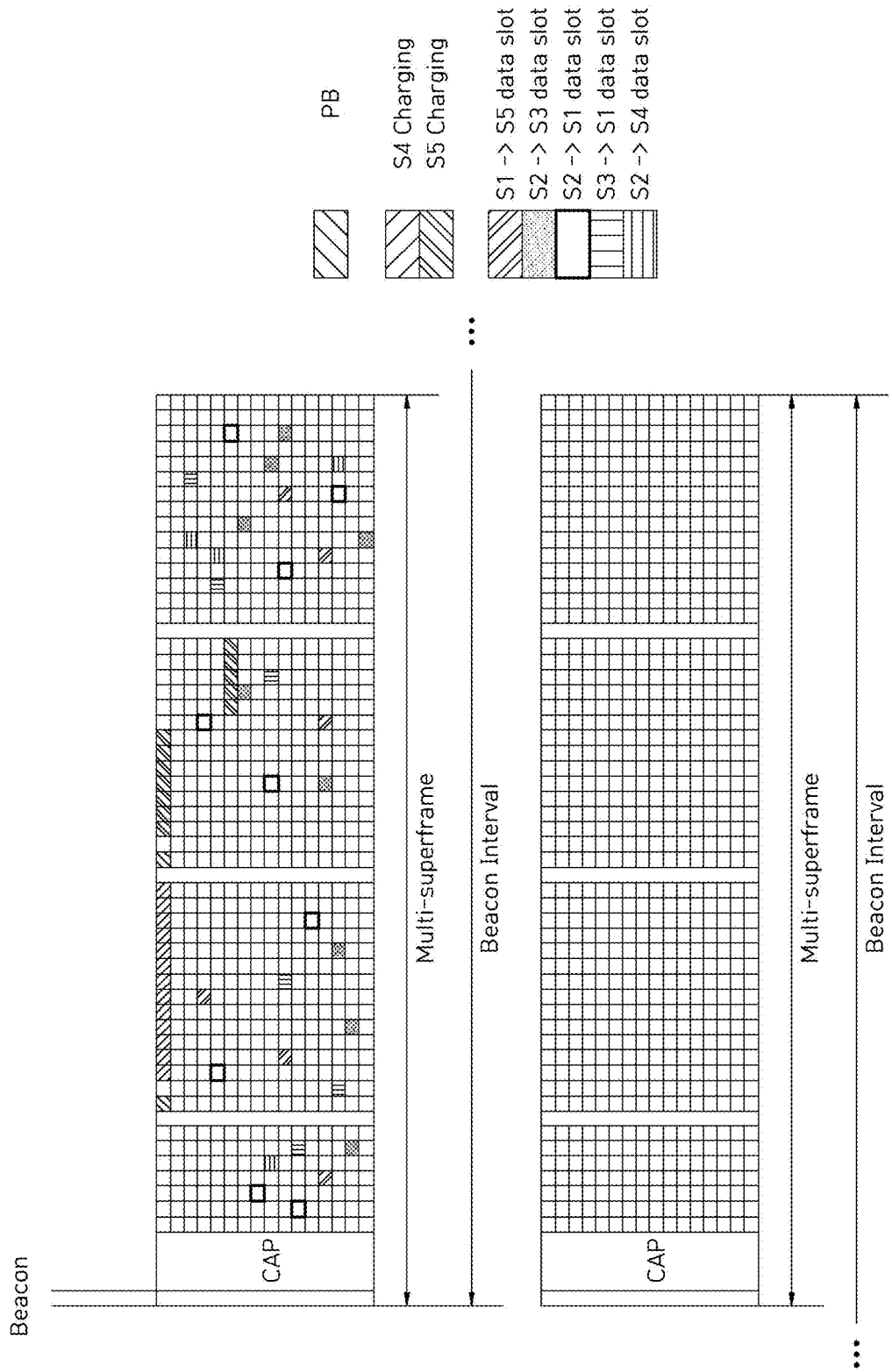
FIG. 2 is a diagram illustrating an improved superframe structure proposed according to the described technology.

The described technology modifies the example superframe structure shown in FIG. 1 to propose a new superframe structure for removing power supply constraints of the existing power receiving device based on beamforming and performing low-power data transmission and reception through efficient scheduling, as shown in FIG. 2. In the described technology, a power transmitting unit (PTU), which is a power transmitting device, serves as a master that transmits a beacon signal, and a power receiving unit (PRU), which is a power receiving device, serves as a slave that communicates with a master or other receiving terminals in the CAP section and the CFP section.

Referring to FIG. 2, the superframe proposed by the described technology has a structure that allows CAP reduction and has only one CAP during one multi-superframe. In addition, the described technology does not only use a beacon (master beacon (MB)) for synchronizing the network but also uses a positioning beacon (PB) for informing the position of the PRU to perform beamforming.

An MB is a beacon that is transmitted from a master, which is a power transmitting terminal, to a slave, which is a power receiving terminal, and serves to provide network synchronization data to slaves located in the same network as the master. The MB includes fixed channel data and network structure data. In detail, the fixed channel data includes a common channel number to be used during the CAP section. The network structure data includes data of SO, MO, and BO, which are constant values used for calculating the number of multi-superframes during one beacon interval, the number of superframes during one multi-superframe, and a time per slot.

After an MB is transmitted, a CAP section for network formation exists. In the CAP section, all devices communicate using one common channel through Carrier Sense Multiple Access (CSMA) communication. Slaves attempt to join the network by transmitting a join request message including a sub-Slot Allocation Bitmap (SAB) that contains slot data desired to be requested by the slaves. The master receives the join request message, checks slot allocation information of the master, and transmits information about slots allocatable to the slaves in a response message. The slave having received the response message broadcasts the slot information allocated thereto to the surroundings to prevent slot allocation collision in the CFP section.

A slave that desires to receive power transmits a join request message including charging information, which is data requesting power transfer. The charging information includes the amount of power needed by the slave, the number of slots according to the time to receive power, and a slot number or channel ID of the CFP section at which the slave desires to receive power. Upon receiving the join request message, the master allocates the slave to a superframe that does not transmit power and then transmits a response message containing data for allocating a slot for power transfer and a spare slot in the superframe. That is, times P_TX and P_RX for power transfer, that is, the number of allocated slots, are determined during the CAP section. The slave notifies other slaves and the master of the determined result. In other words, the slave broadcasts the determined result. After that, the process is the same as the above.

As another embodiment, the slave that desires to receive power may be configured to transmit the amount of power needed by the slave, the number of slots according to the time to receive power, and a slot number or channel ID of the CFP section at which the slave desires to receive power in a charging request message, aside from the join request message. In the specification, the above process (MB transmission-join request-response-notification) is referred to as guaranteed Time Slot (GT S)-handshaking.

Through repetition of the above process within the CAP section, a network is completely formed.

The CFP section includes seven slots after the CAP section in the first superframe of the multi-superframe and fifteen slots after a beacon slot in the following superframe. A total of 16 channels exist in the CFP section, and each channel is divided into fifteen time slots so that the slots are individually allocated to nodes to perform communication or power transfer/reception.

A channel for power transfer is determined during the CAP, and since a spare channel is set, power is transmitted and received through the spare channel when the quality of power transmission/reception is degraded. This is referred as channel adaptation, with which the efficiency of power transfer may be improved.

In the described technology, in order to increase the efficiency of wireless power transfer, power is transmitted by concentrating transmission power at a specific location, that is, by beamforming power. The key to beamforming technology is to accurately form power and transmit the power to a desired location. Therefore, in order to beamform power to a specific PRU location, the PTU transmitting power needs to identify the location of the PRU. In order for the PRU to inform the power transmitting terminal of the location of the PRU, the PRU transmits a specific data signal (PB) in the first slot section of the CFP section or the first slot section of the GTSs so that the power transmitting terminal recognizes the location of the PRU.

The PB includes phase information indicating the location of the PRU that desires to receive power. Alternatively, the PRU may transmit an unmodulated sine wave at the end of the PB for a certain period of time so that the power transmitting terminal calculates the transmission direction of the PB. The PTU receives data of the PB and extracts the phase of a signal incident from each transmission antenna or performs a position recognition algorithm, such as a MUltiple SIgnal Classification (MUSIC) algorithm, to identify the location of the PRU to which power is beamformed. As described above, the times P_TX and P_RX for power transfer, that is, the number of allocated slots, are predetermined during the CAP section.

As another embodiment, the PRU may be provided to consecutively transmit the PBs within a slot section in which the PRU desires to receive power.

Hereinafter, a Simultaneous Wireless Information and Power Transfer (SWIPT) system according to the described technology will be described with reference to FIGS. 3 and 4.

Figure 3:
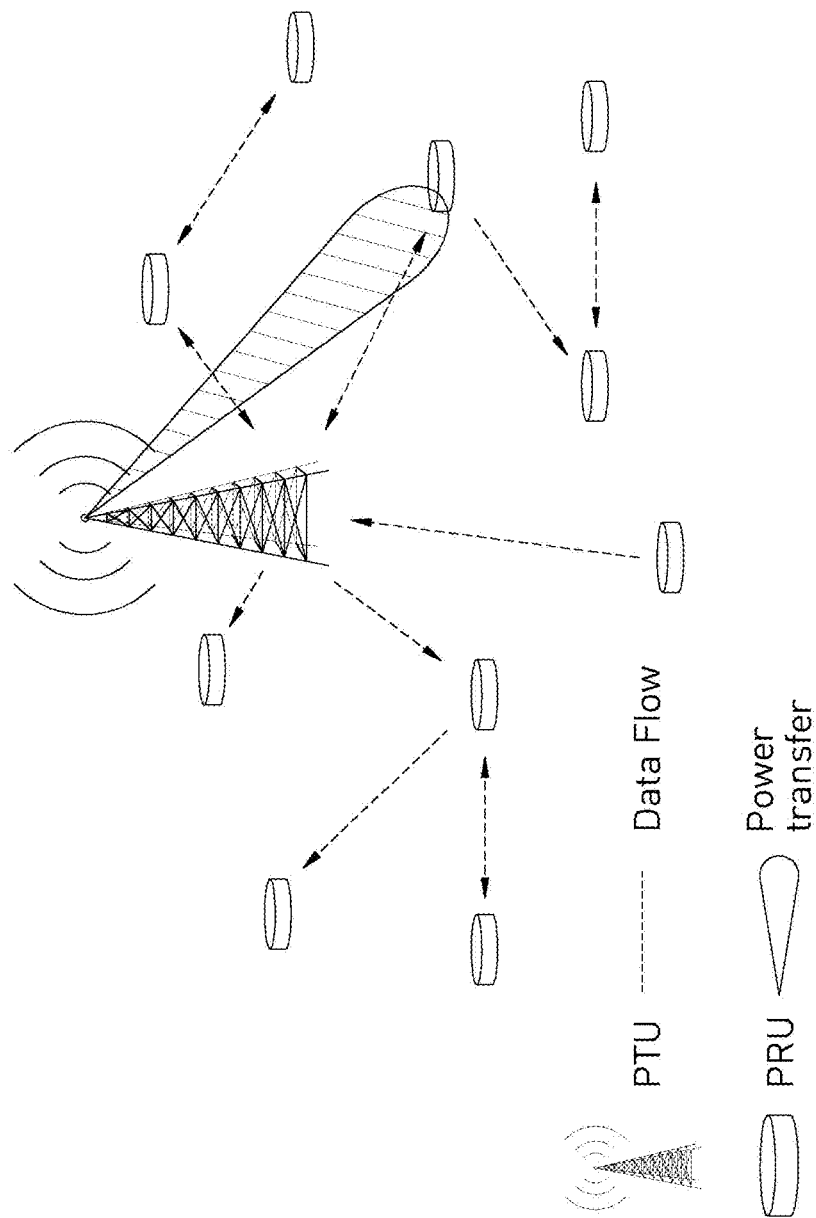
FIG. 3 is a schematic view illustrating a Simultaneous Wireless Information and Power Transfer radio frequency Wireless Power Transfer (SWIPT RF WPT) system according to the described technology.

Referring to FIG. 3, a SWIPT system architecture according to the described technology may include one or more PTUs and n (n≥1) PRUs forming SWIPT coordination in a mesh-topology communication structure. The PTU and the PRU serve as a master and a slave, respectively.

The PTU may be a device that includes a plurality of array antennas to perform beamforming and is connected to a constant power source. The PRU may be a variety of devices that consume power, including mobile phones/wearable devices, sensors, bikes, and vehicles.

Figure 4:
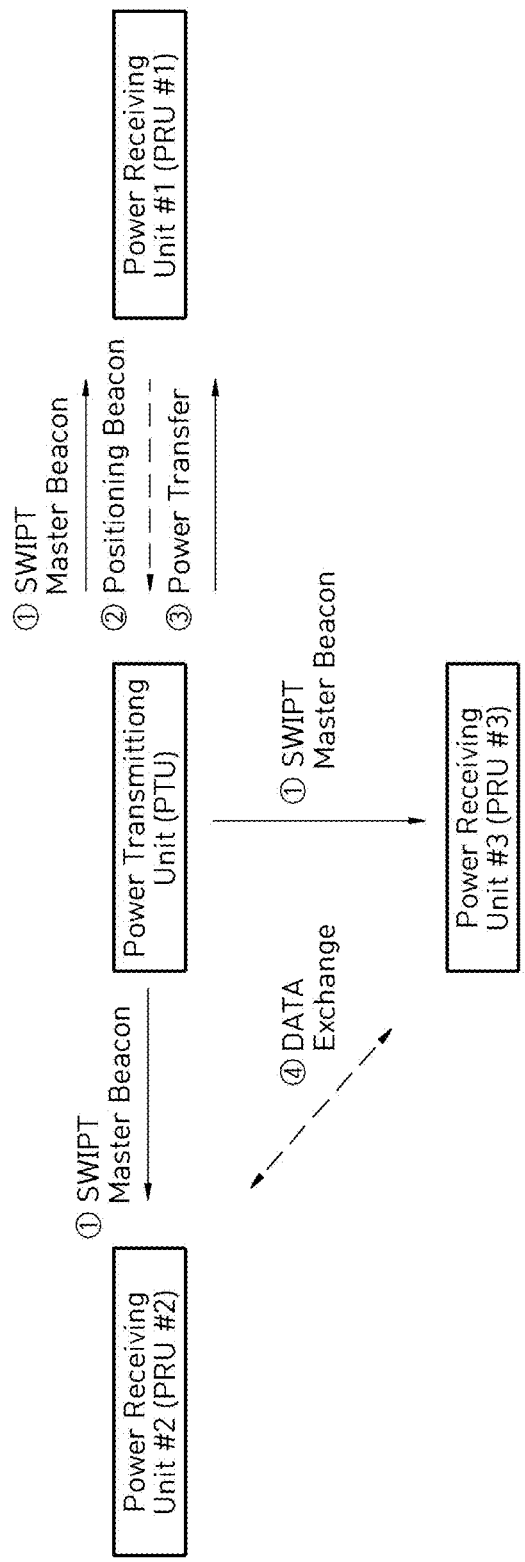
FIG. 4 is an operation flowchart showing the SWIPT RF WPT system according to the described technology.

FIG. 4 shows a module configuration required for the standard. ① PRUs receive a specific SWIPT MB signal defined by the PTU for SWIPT and connect to the corresponding communication system (coordination). The PRUs caused to enter the system by the SWIPT MB are assigned a GTS of a specific time and a specific frequency through a CAP section to exchange information or receive power. ② In the CFP section, PRU #1, which has been assigned a WPT GTS for wireless power, transmits a PB for informing the location of PRU #1 to the PTU. ③ The PTU transfers power to PRU #1 during the allocated WPT GTS using direction information extracted from the PB. In this case, ④ each PRU performs data exchange using a GTS allocated for communication.

Figure 5:
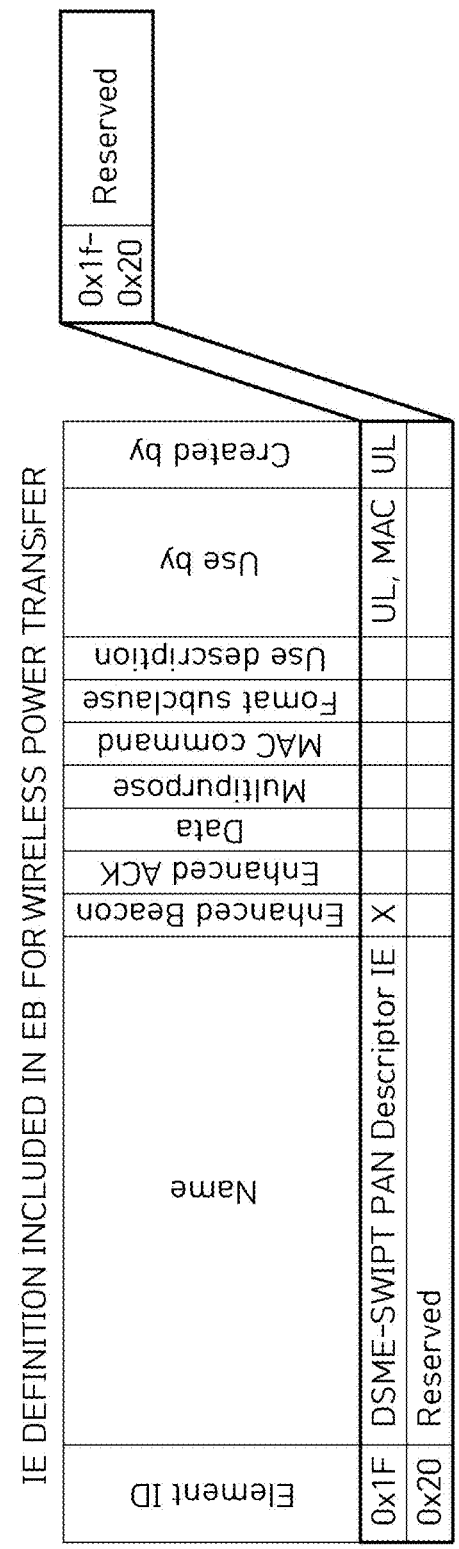
FIG. 5 is a diagram illustrating an example DSME Extended Beacon signal of IEEE 802.15.4-2015, to which an information element (IE) is added for simultaneous power and data transmission according to an embodiment of the described technology.

FIG. 5 is a diagram illustrating element ID data for assigning respective operation modes of data elements (information elements (IEs)) of a DSME Extended Beacon of IEEE 802.15.4-2015 adopted by an embodiment of the described technology, to which DSME-SWIPT PAN descriptor IE data proposed by the described technology is added. For SWIPT, the PTU transmits a SWIPT MB using an element ID value of 0x1F to form the SWIPT-DSME coordination.

Figure 6:
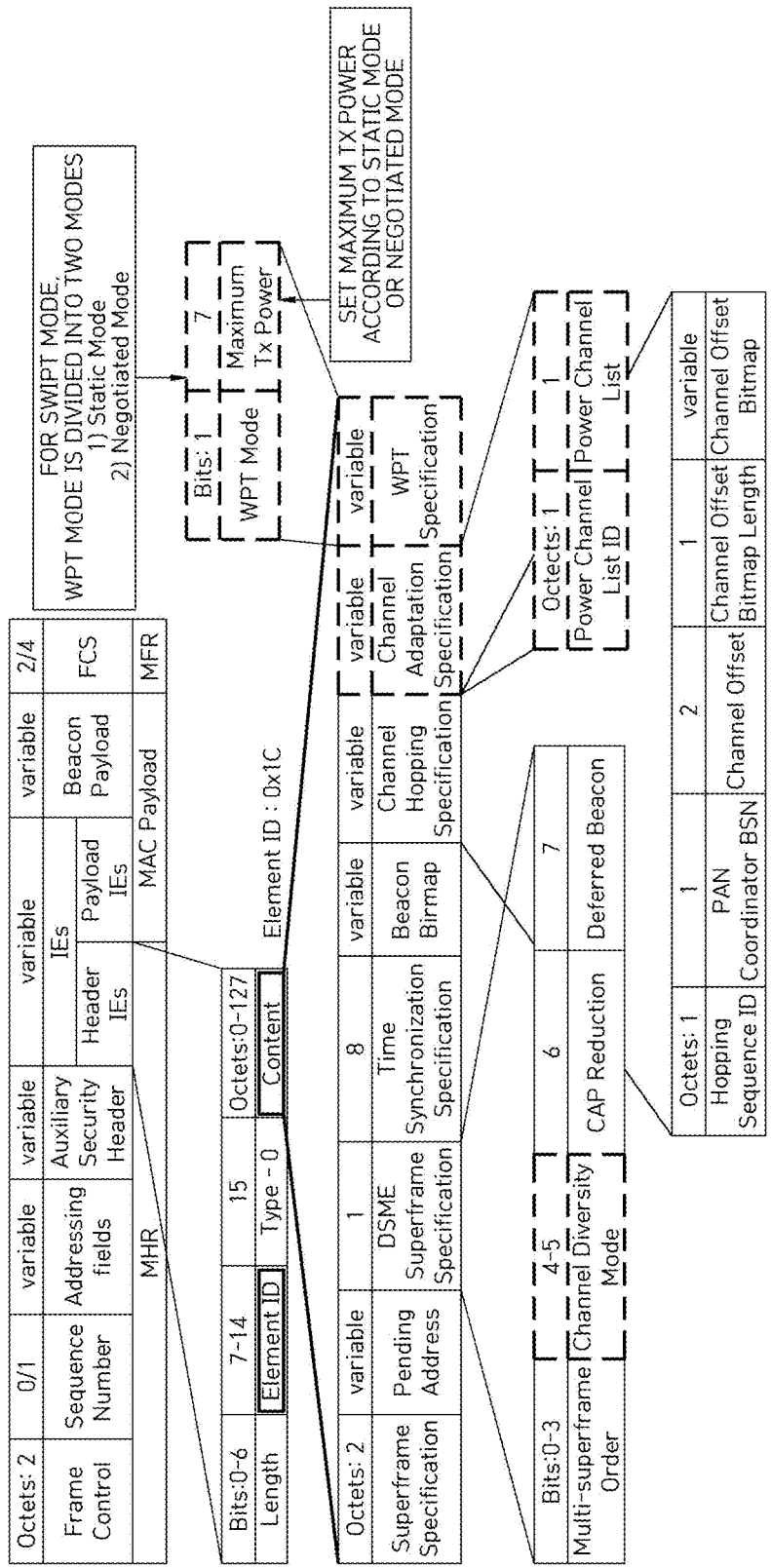
FIG. 6 is a diagram illustrating packet information of a SWIPT master beacon according to an embodiment of the described technology.

FIG. 6 is a diagram illustrating packet information of a SWIPT MB. A portion indicated by a bold dotted line in FIG. 6 is a packet portion additionally proposed to use the SWIPT system. Details of the proposed packet portion are shown in Table 1 below.

TABLE 1

| Name | Descriptions |
| --- | --- |
| Channel Adaptation Specification | Including Channel Adaptation data for WPT |
| Channel Diversity Mode | Setting to 0 for Channel Adaptation, setting to 1 for Channel Hopping, and setting to 2 when using both Channel Adaptation and Channel Hopping |
| Power Channel List ID | Setting to 0 (default) when using all 16 channels, and setting to 1 when using Power Channel determined by a PAN coordinator |
| Power Channel List | Indicating a list of channels available for WPT |
| WPT Mode | Setting to 0 for Static Mode, and setting to 1 for Negotiated Mode |

The number of preferred channels and the corresponding channel numbers are defined, and a WPT mode, more specifically, a SWIPT mode, is defined. The SWIPT mode may include a Static mode and a Negotiated mode. The Static mode is a mode supported by general communication, and when assuming communication protocols by countries, allowing a maximum value of, for example, one watt in a single power transmitting terminal, and allowing up to four watts through an antenna gain of a power receiving terminal, but a mode that does not affect adjacent frequency bands.

The Negotiated mode is a mode in which power is transferred through mutual agreement without considering the effect on adjacent frequency bands in a situation in which only one PTU and one PRU exist, in which transfer power may be increased as high as possible in hardware.

The Power Channel List ID is set to 0 (default) when all 16 channels (Nos. 11 to 26) are used and set to 1 when a power transfer channel determined by the PTU (the PAN coordinator) is used. Meanwhile, physical channels 0 to 10 are in a band around 900 MHz and defined for ZigBee communication in IEEE.

Figure 7:
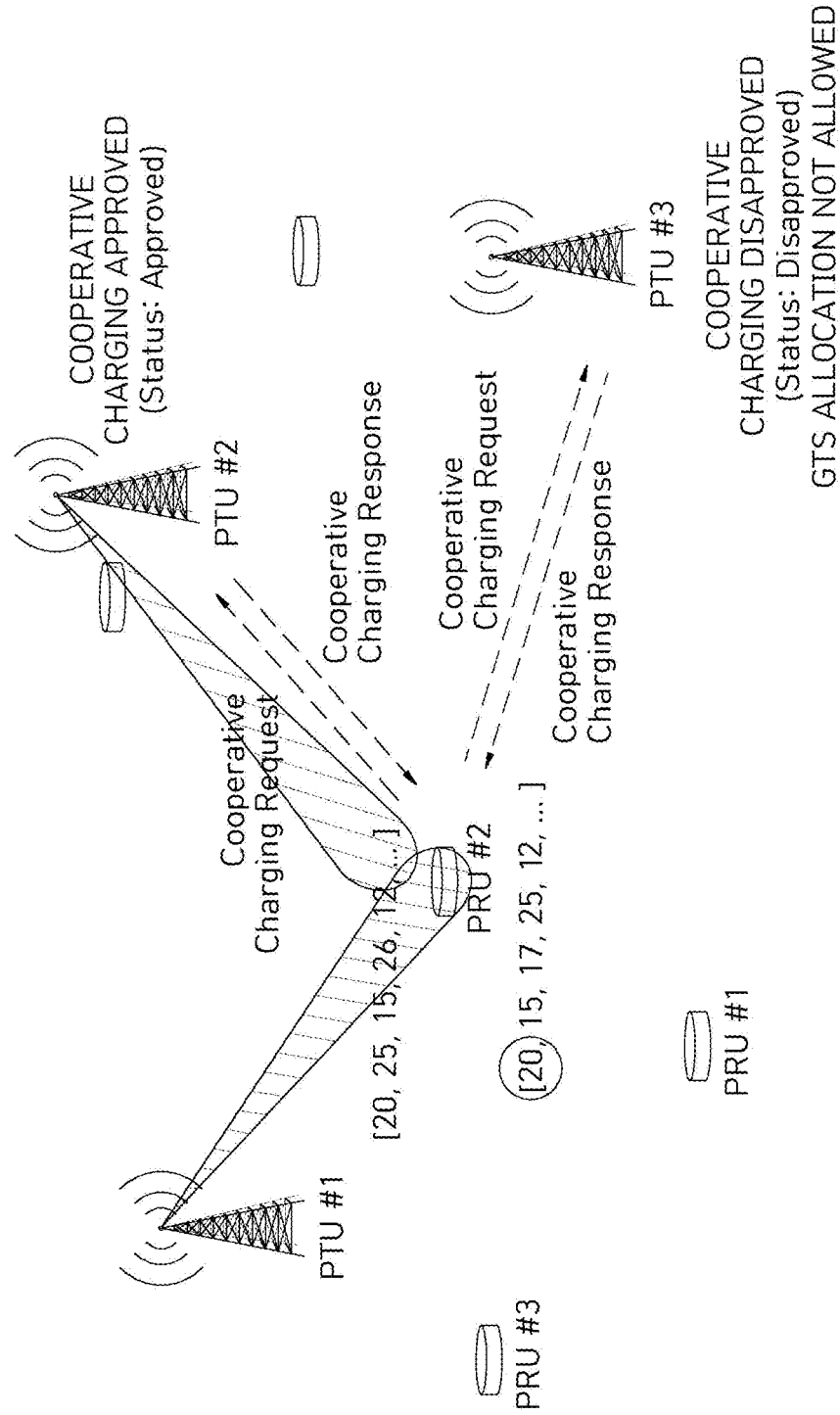
FIG. 7 is a diagram illustrating a distributed cooperative charging operation according to an embodiment of the described technology.

FIG. 7 is a diagram illustrating a distributed cooperative charging operation according to an embodiment of the described technology. The order of operations is as follows.
1) PRU #2 receives a SWIPT MB from a PAN coordinator PTU #1
2) PRU #2 requests information/power GTS allocation in the CAP section
3) Then, PRU #2 receives beacon signals from PTU #2 and PTU #3.
4) In this case, PRU #2 requests distributed cooperative charging to PTU #2 and PTU #3.
   The PRU transmits a cooperative charging request command to the nearby PTUs in a unicast manner by transmitting a cooperative charging request command including a SAB sub-block indicating a power transfer GTS allocated by PTU #1.
5) PTU #2 and PTU #3 each compare SAB sub-blocks of PTU #2 and PTU #3 with the received SAB sub-block and allocate a power transfer GTS when allocation is performable.

PTU #2 and PTU #3 update SAB sub-blocks and allocation counter tables (ACTs) of PTU #2 and PTU #3 and transmit a cooperative charging response (perform distributed cooperative charging GTS allocation).

When cooperative charging is not approved, PRU #2 may not cooperatively charge from the corresponding PTU.

A scenario of operations, including a SWIPT radio frequency (RF) WPT GTS allocation and other processes, to be performed by each action agent will be described in more detail with reference to FIGS. 8A to 10C.

Figure 8A:
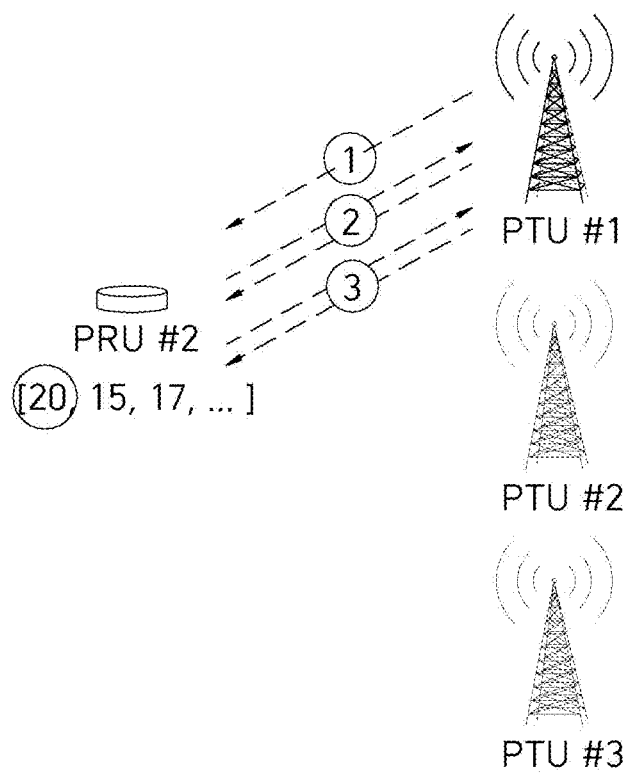
Figure 8B:
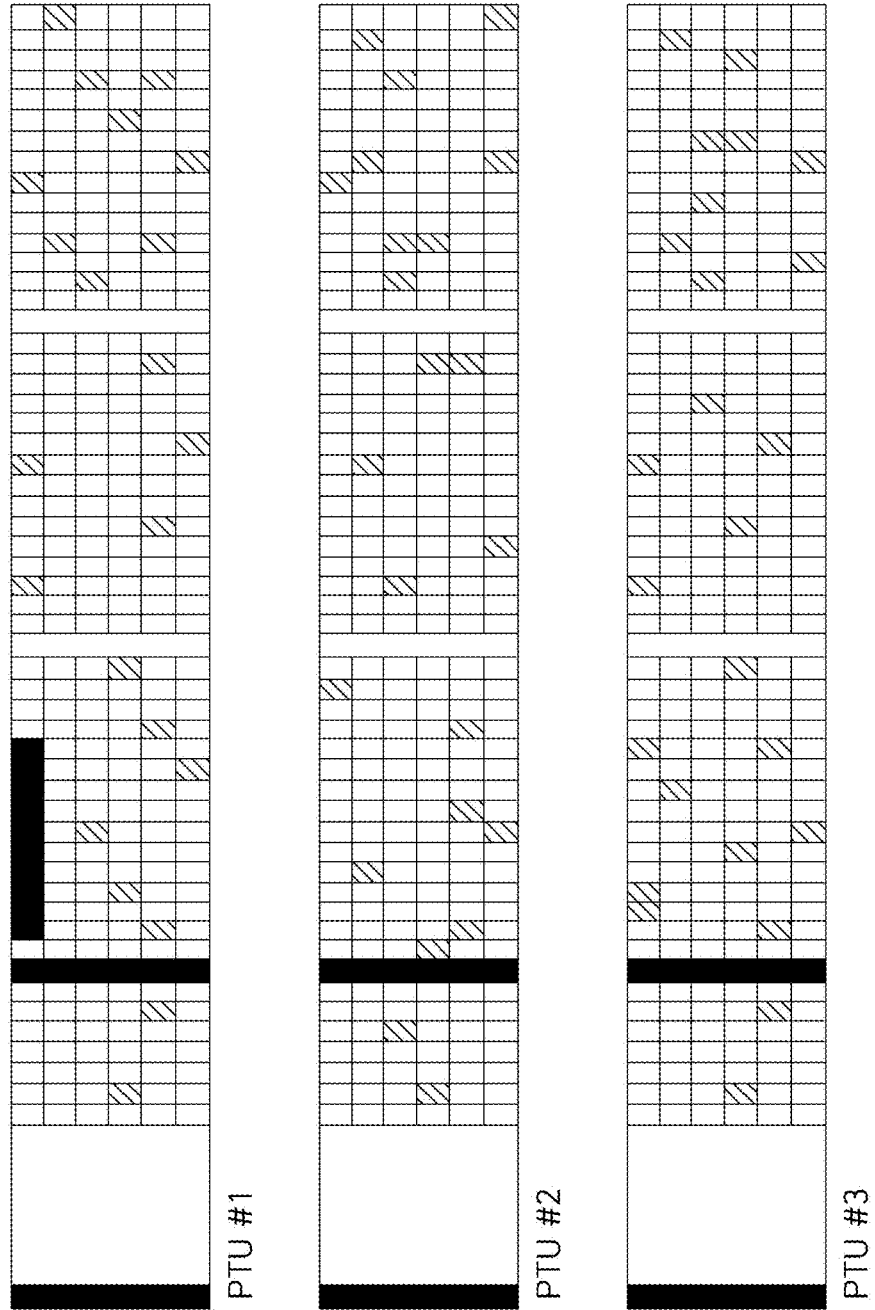
Figure 8C:
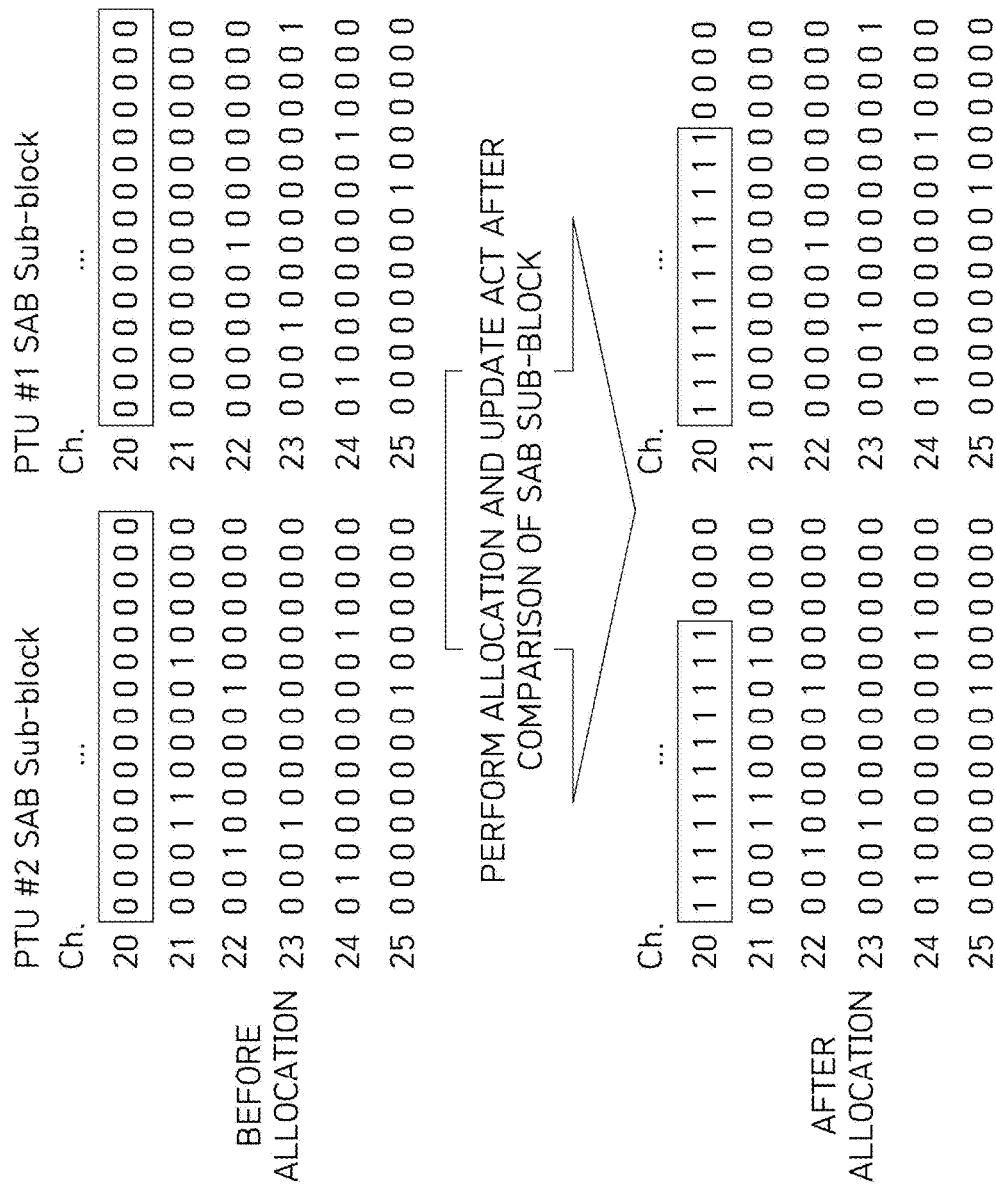

The processes shown in FIGS. 8A to 8C are as follows.
① PTU #1: SWIPT MB transmission
② PRU #2: Join Req/Resp→PTU #1 becomes a parent of PRU #2
③ PRU #2: Power/Data GTS Allocation FIG. 8B illustrates multi-superframes when performing the above-described processes, and FIG. 8C illustrates SAB sub-blocks of PTU #1 and PRU #2 before and after power transfer GTS allocation.

FIGS. 8A to 8C illustrate an embodiment in a case in which PRU #2 requests PTU #1 to allocate power transfer GTSs to channel 20 and receives an affirmative response to the request.

Figure 9A:
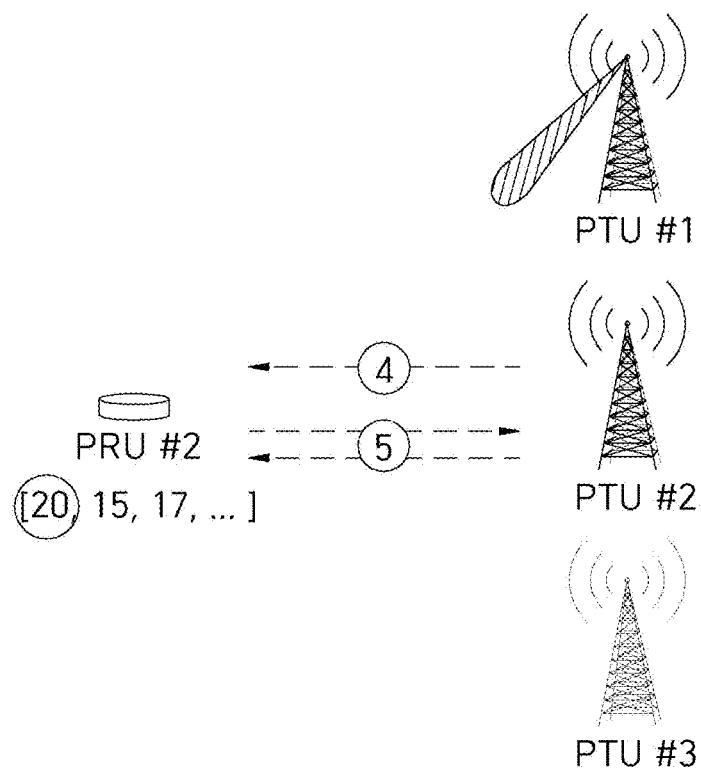
Figure 9B:
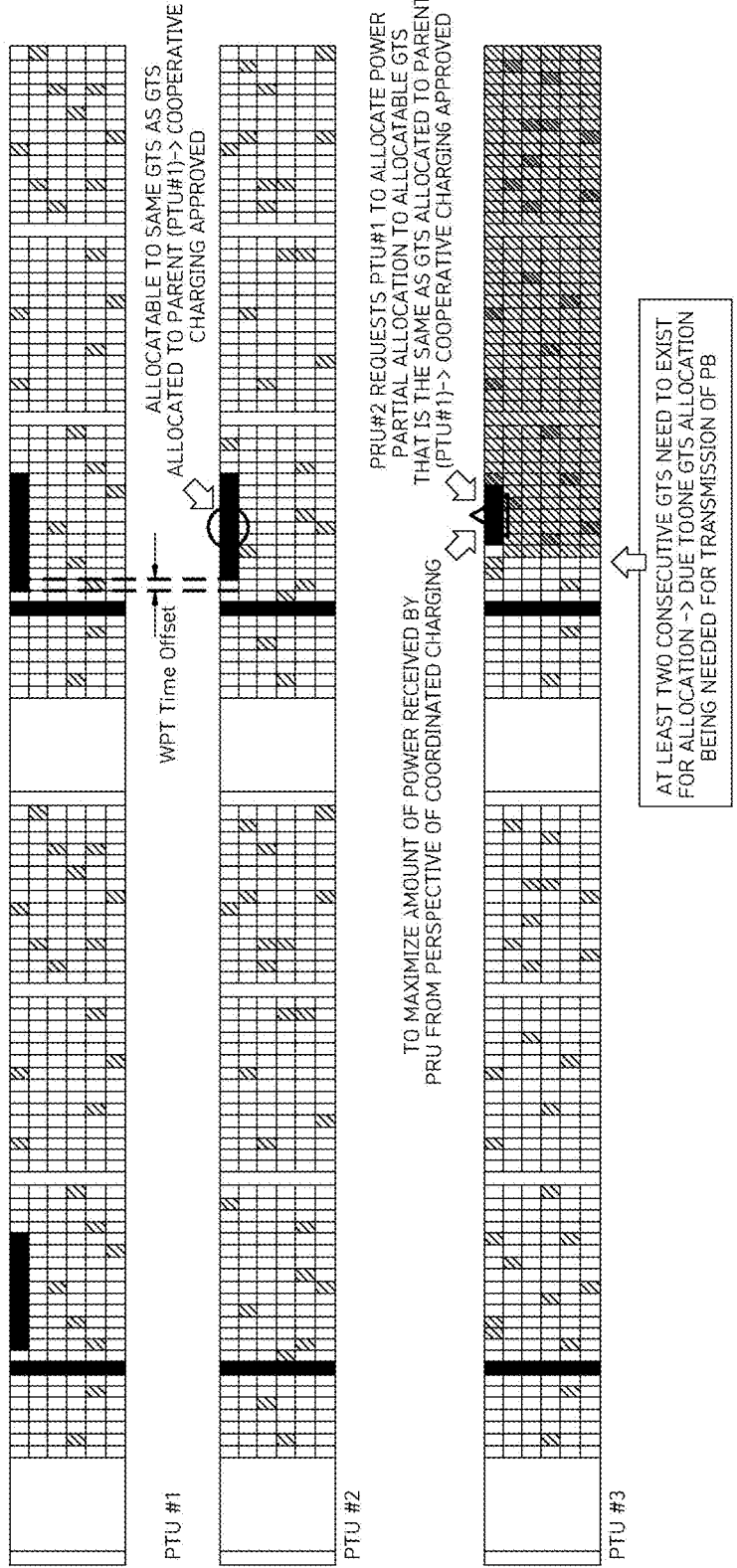

The processes shown in FIGS. 9A to 9C are as follows.
④ PTU #2: SWIPT MB transmission→allowed to request Cooperative charging (presence of nearby PTUs that are not the Parent PTU)
⑤ PRU #2 & PTU #2: Cooperative charging Req/Resp/Notify→Cooperative charging approved FIG. 9B illustrates multi-superframes when performing the above-described processes, and FIG. 9C illustrates SAB sub-blocks of PTU #2 and PRU #2 before and after power transfer GTS allocation.

FIGS. 9A to 9C illustrate an embodiment in a case in which PRU #2 requests PTU #2 to allocate power transfer GTSs to channel 20 as allocated to Parent PTU (PTU #1), and PTU #2 transmits an affirmative response to the request because power transfer GTS is allocatable to the same GTS.

Figure 10A:
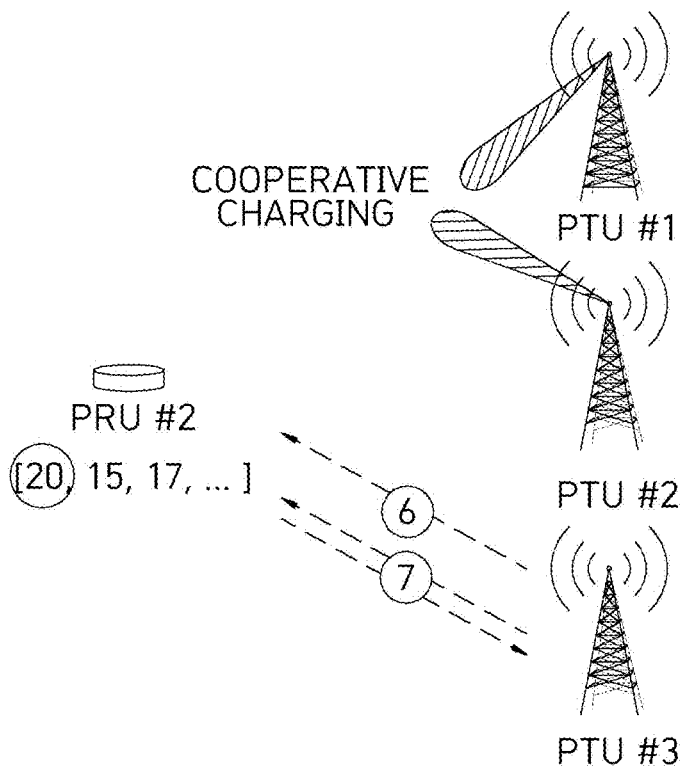
Figure 10B:
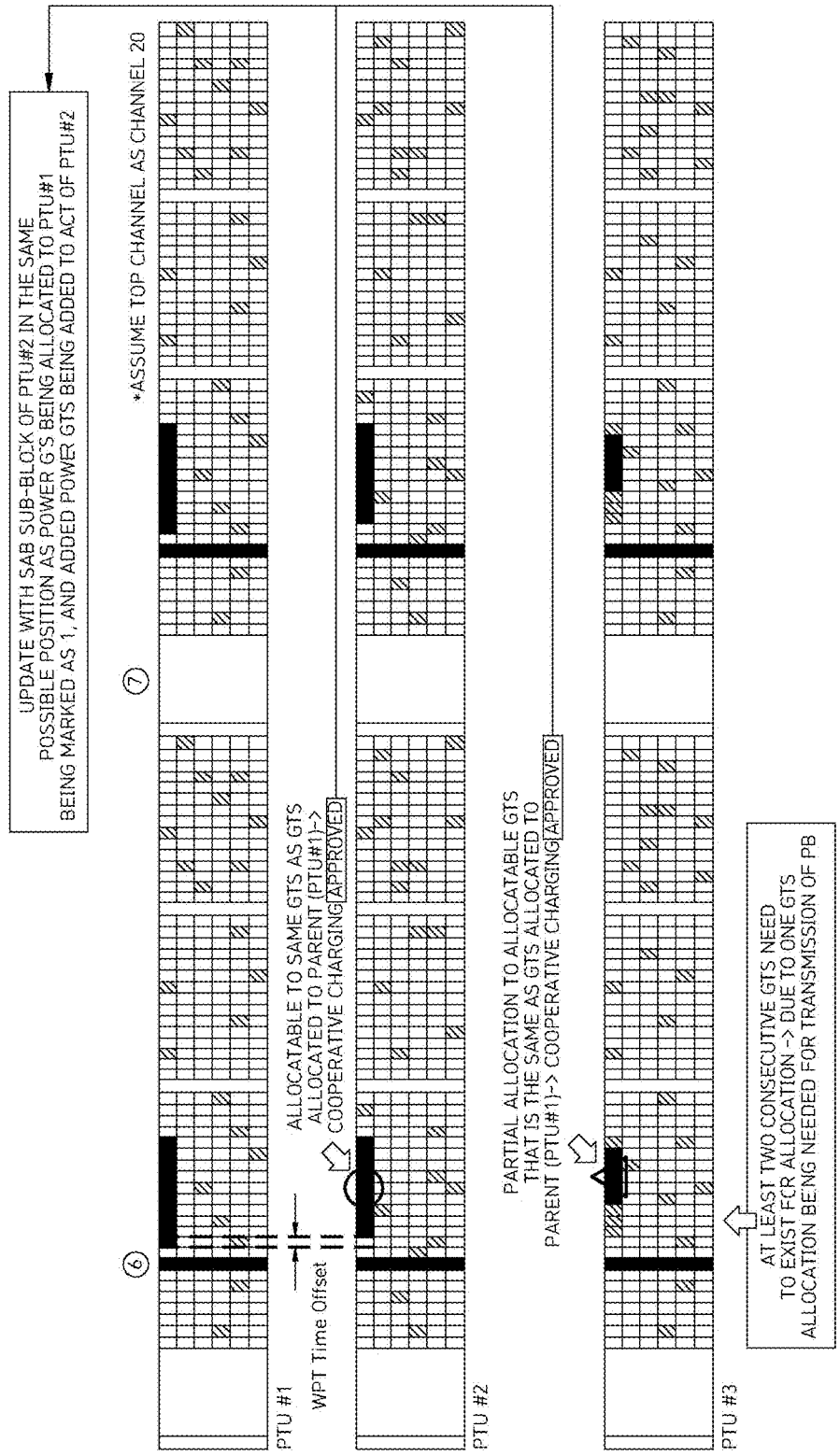
Figure 10C:
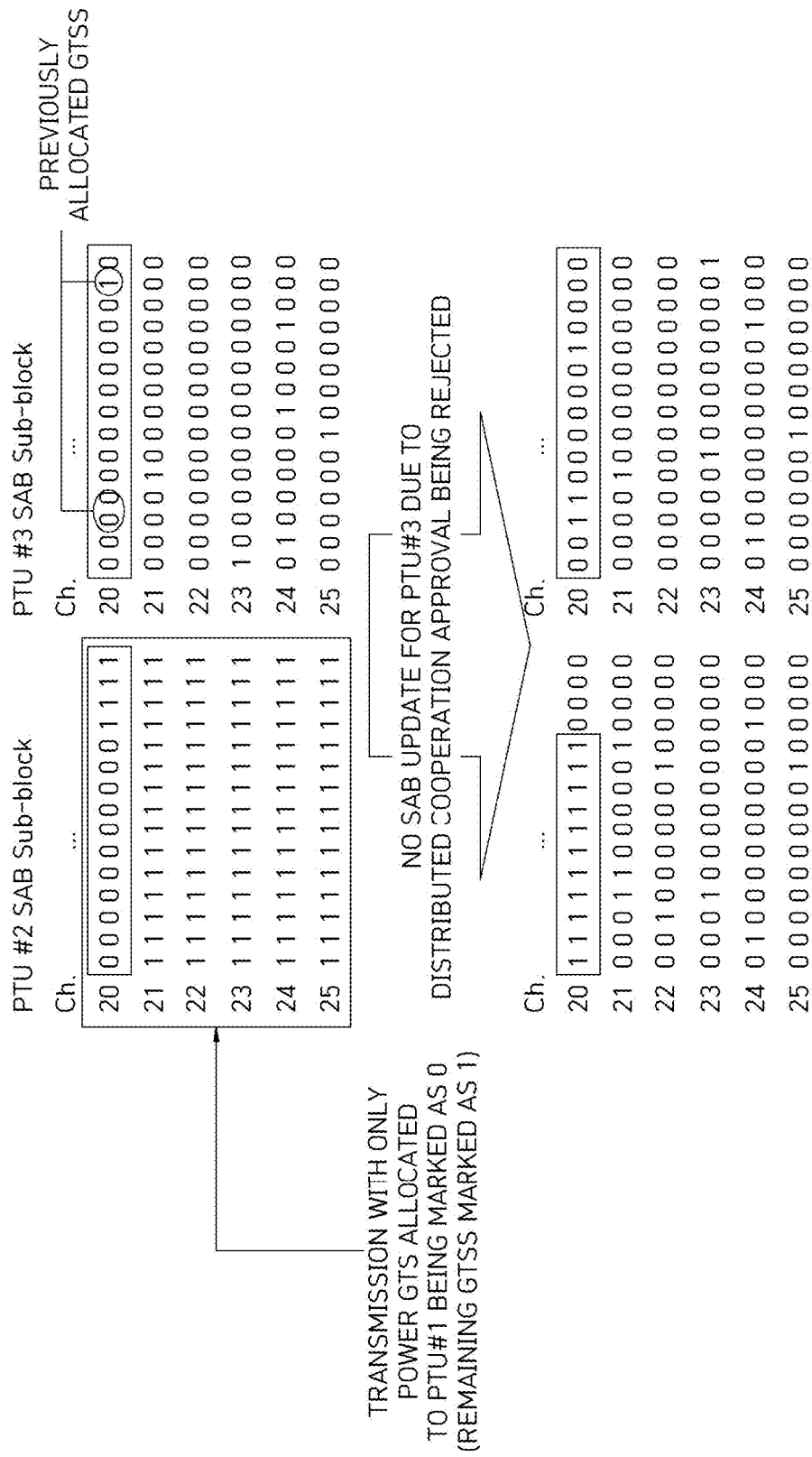

The processes shown in FIGS. 10A to 10C are as follows.
⑥ PTU #3: SWIPT MB transmission→allowed to request Cooperative charging (presence of nearby PTUs that are not the Parent PTU)
⑦ PRU #2 & PTU #3: Cooperative charging Req/Resp/Notify→Cooperative charging approval rejected FIG. 10B illustrates multi-superframes when the above-described processes are performed, and FIG. 10C illustrates SAB sub-blocks of PTU #2 and PRU #2 before and after power transfer GTS allocation.

FIGS. 10A to 10C illustrate an embodiment in a case in which PRU #2 requests PTU #3 to allocate power transfer GTSs to channel 20 as allocated to Parent PTU (PTU #1), and PTU #3 transmits a negative response to the request because power transfer GTS is not allocatable to the same GTS.

FIG. 11 illustrates MAC commands of IEEE 802.15.4-2015 adopted by the described technology, to which additional information of a MAC command is added for distributed cooperative charging of SWIPT RF WPT according to the described technology, which shows the above-described cooperative charging request command and cooperative charging response command added to the MAC commands of IEEE 802.15.4-2015.

Figure 12:
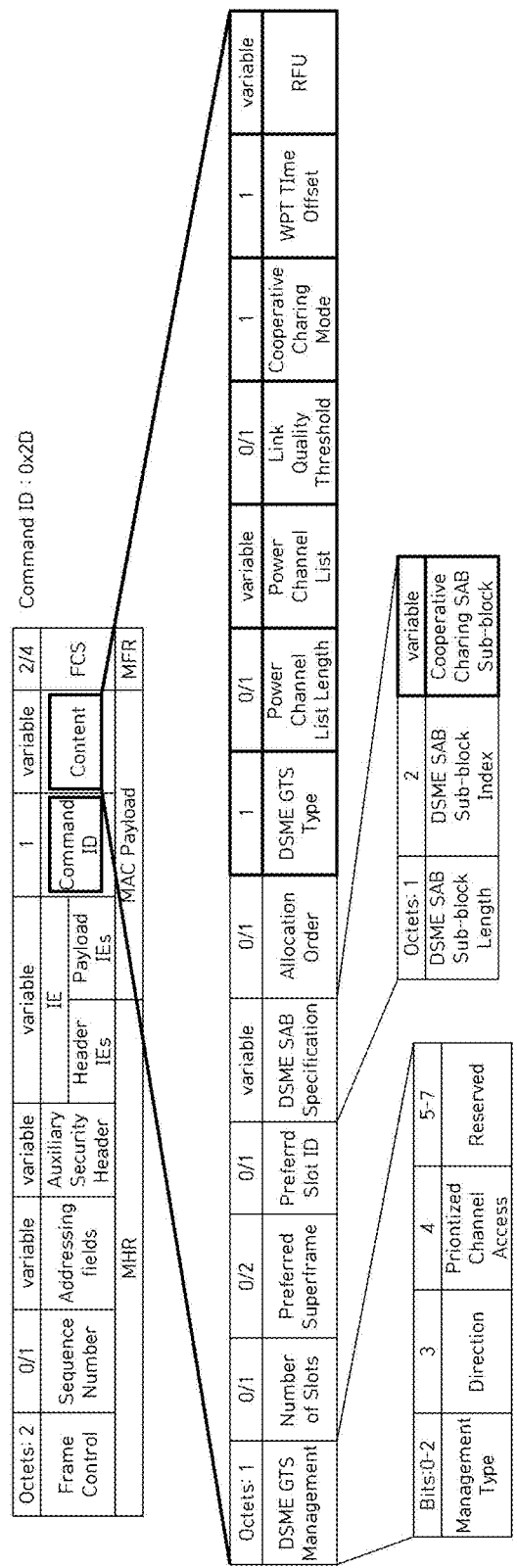
FIG. 12 is a packet structure diagram of a cooperative charging request command according to an embodiment of the described technology.

FIG. 12 illustrates the structure of a cooperative charging request command used by a PRU to join a SWIPT system in a CAP section. In this case, the command has a command ID of 0x2D, and a packet portion that is additionally proposed to use the SWIPT distributed cooperative charging system is indicated by a bold line, and details of the proposed packet portion are shown in Table 2.

TABLE 2

| Name | Descriptions |
| --- | --- |
| Cooperative Charging SAB Sub-block | Indicating a SAB sub-block in which only a GTS corresponding to a Power GTS allocated to a Parent PTU is marked as 0 |
| DMSE GTS Type | Setting to 0 for Data GTS and setting to 1 for Power GTS |
| Power Channel List Length | Existing only when DSME GTS Type is set to 1 and indicating the length of a Power Channel List |
| Power Channel List | Indicating the Power Channel List, which is arranged in the descending order according to channel quality (Set of Integers) |
| Link Quality Threshold | Indicating Link Quality Threshold for Channel Adaptation |
| Cooperative Charging Mode | Setting to 1 when cooperative charging is performable |
| WPT Time Offset | Indicating a Time Offset value for setting a WPT start point according to the distance estimated through MB reception. |

Among these, the WPT Time Offset will be described in more detail as follows. In a case in which two or more PTUs transmit power to one PRU at the same time, when the power transfer signals of respective PTU are received in phase with each other by the PRU, the signals may be amplified, but out-of-phase reception may lead to the transmission efficiency decreasing, and inverse-phase reception may lead to power reception even becoming 0. However, from the perspective of the PRU that receives power, the distances between each PTU and the PRU may be different, and due to the difference in distances, power transfer signals may be received in different phases. Accordingly, in order for the power transfer signals transmitted by the respective PTUs to be received by the PRU in phase with each other even when the PTUs are located at different distances, data instructing each PTU when the PTU needs to start transmitting the power signal is transmitted, and the data is referred to as a WPT Time Offset.

The PRU may estimate the distance to each PTU through reception of the MB input from each PTU and, accordingly, obtain the WPT Time Offset for each PTU.

Figure 13:
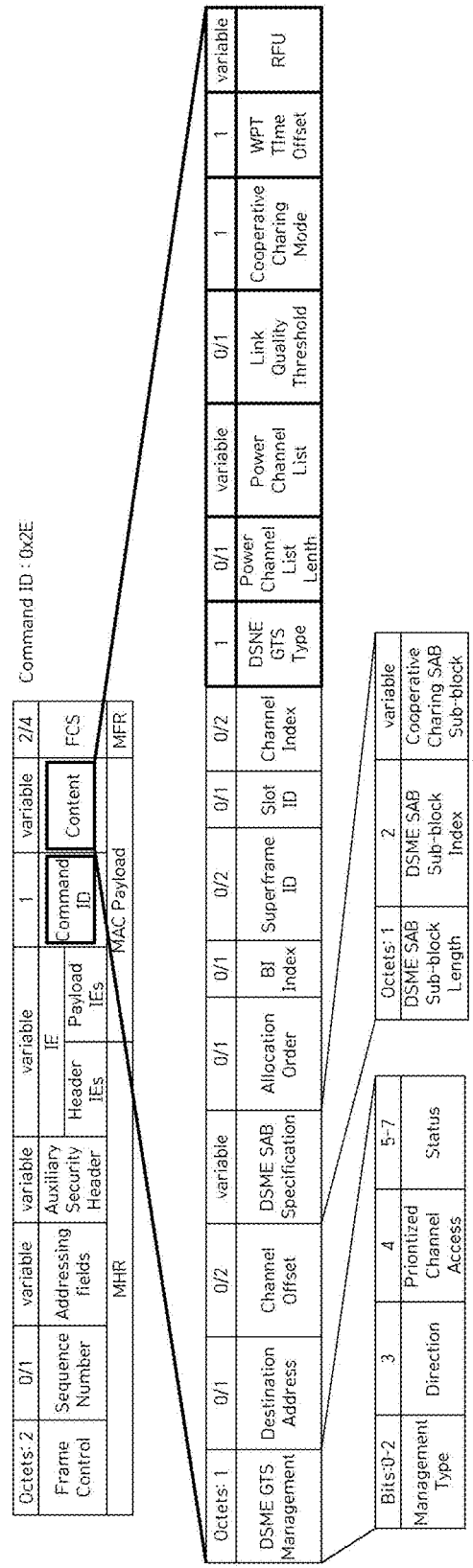
FIG. 13 is a packet structure diagram of a cooperative charge response command according to an embodiment of the described technology.

FIG. 13 is a cooperative charging response command used by a PTU for a PRU in the CAP section, which is provided to allow joining in the SWIPT distributed cooperative charging system and allocating GTSs. In this case, the command has a command ID of 0x2E, and a packet portion additionally proposed to use the SWIPT distributed cooperative charging system is indicated by a bold line, and the details of the proposed packet portion are shown in Table 3.

TABLE 3

| Name | Descriptions |
| --- | --- |
| Cooperative Charging SAB Sub-block | Indicating a SAB sub-block in which only a GTS corresponding to a Power GTS allocated in a Parent PTU is marked as 0 |
| DMSE GTS Type | Setting to 0 for a Data GTS and setting to 1 for a Power GTS |
| Power Channel List Length | Existing only when DSME GTS Type is set to 1 and indicating the length of a Power Channel List |

TABLE 3-continued

| Name | Descriptions |
| --- | --- |
| Power Channel List | Indicating the Power Channel List, which is arranged in a descending order according to channel quality (Set of Integers) |
| Link Quality Threshold | Indicating Link Quality Threshold for Channel Adaptation |
| Cooperative Charging Mode | Setting to 1 when cooperative charging is performable |
| WPT Time Offset | Indicating a Time Offset value for setting a WPT start point according to a distance estimated through MB reception |

Figure 14:
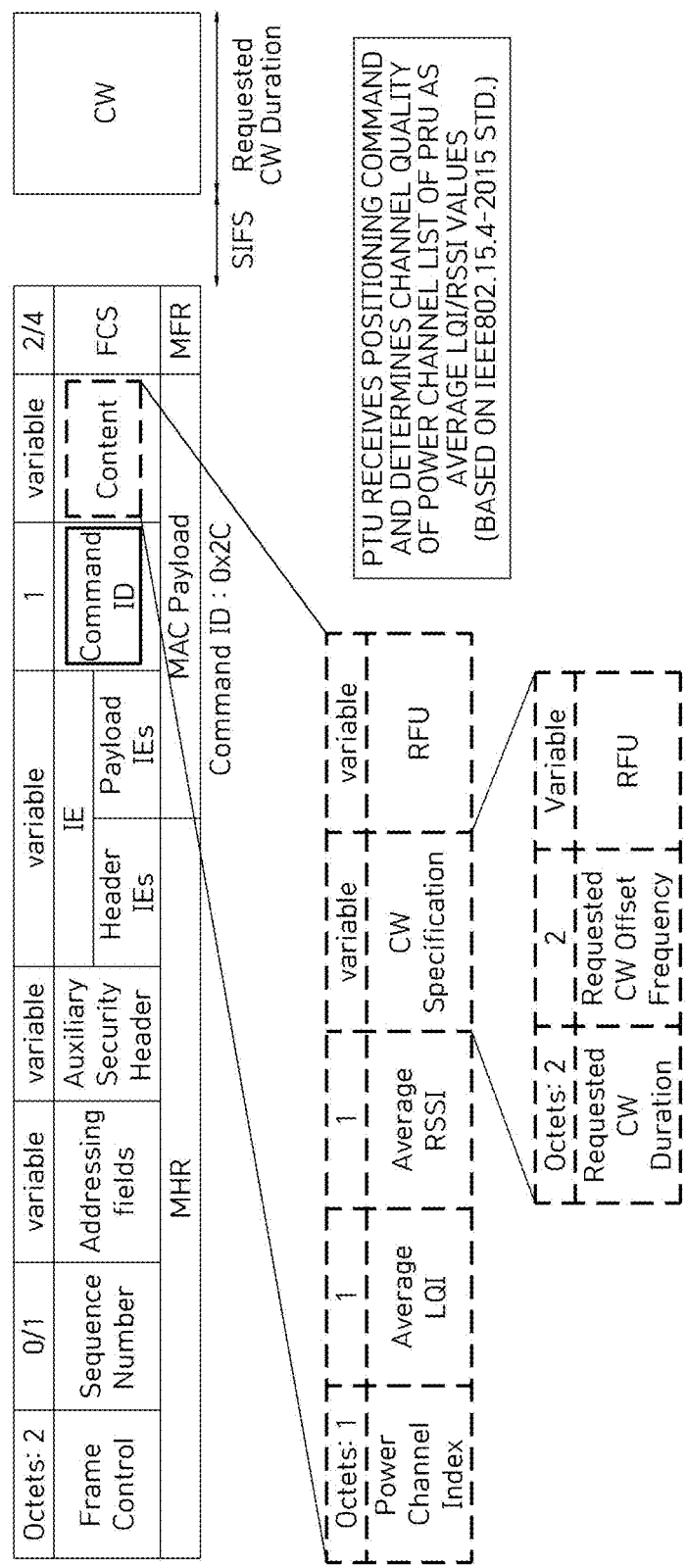
FIG. 14 is a packet structure diagram of a positioning beacon according to an embodiment of the described technology.

FIG. 14 illustrates DSME-SWIPT GTS PB command packet information used by a PRU to inform a PTU of the location of the PRU in the CFP section. In this case, the command has a command ID of 0×2C, and a packet portion additionally proposed to use the SWIPT system is indicated by a bold dotted line, and details of the proposed packet portion are shown in Table 4.

TABLE 4

| Name | Descriptions |
| --- | --- |
| Power Channel Index | Indicating an index of a Power Channel number |
| Average LQI | Indicating an average link quality indicator (LQI) of a Power Channel |
| Average RSSI | Indicating an average receives signal strength indication (RSSI) of a Power Channel |
| CW Specification | Indicating continuous wave (CW) information including direction information |
| Requested CW Duration | Indicating a duration of CW required by a PTU, with a difference of 0.5 μs occurring for every 1 bit |
| Requested CW Offset Frequency | Indicating an offset frequency of a CW required by a PTU, with a difference of 0.02 kHz occurring for every 1 bit |

On the other hand, the DSME-SWIPT GTS PB command is characterized in that a short interframe space (SIFS) period is followed by a pure, unmodulated CW transmitted for a predetermined time so that the PTU may determine the location of the PRU. The PTU includes an array antenna formed in a specific pattern for beamforming, and since a distance greater than or equal to 10 cm in a RF (electromagnetic waves) band is a far field, signals transmitted from an antenna of the PRU that is 10 cm or more away from multiple antennas of the PTU may be considered signals incident in a straight line. Since all signals have the speed of light, for example, first to tenth pattern antennas spaced apart from each other receive PB signals incident from the PRU with a difference in reception times, and the degree of arrival (DoA) angle is calculated through the time difference so that the PTU may determine a direction in which the PRU is located. However, in order for the PTU to perform the calculation, a pure, unmodulated waveform is required. Accordingly, in the beacon command of the PRU, a predetermined interval period, that is, SIFS, is assigned, and then, a pure sine wave is transmitted in an amount required for the PTU to calculate the DoA.

Hereinafter, a wireless cooperative charging system and method capable of simultaneously transmitting data and power according to the described technology will be summarized as follows with reference to FIGS. 15 and 16.

On the other hand, in the above and below description, when suffixes for an element such as "~unit", "~module", and "~means" are functionally described or limited, the elements described by "~unit", "~module", and "~means" may be implemented as a single piece of hardware, or two or more individual pieces of hardware. For example, the power supply and beamforming control unit 140 may be implemented as a single part or may be implemented and operated as two or more separate devices according to a selection of situation of a person skilled in the art within the technical sprint of the described technology. In addition, some or all of the functions of elements "~unit", "~module", and "~means" may be merged into one or more other elements "~unit", "~module", and "~means" and performed.

That is, the suffixes "~unit", "~module", and "~means" in the present specification are distinguished for the sake of convenience of description and enhancement of understanding of the technical spirit of the described technology and do not limit or restrict the form of configuration of hardware in which the functions are implemented.

Figure 15:
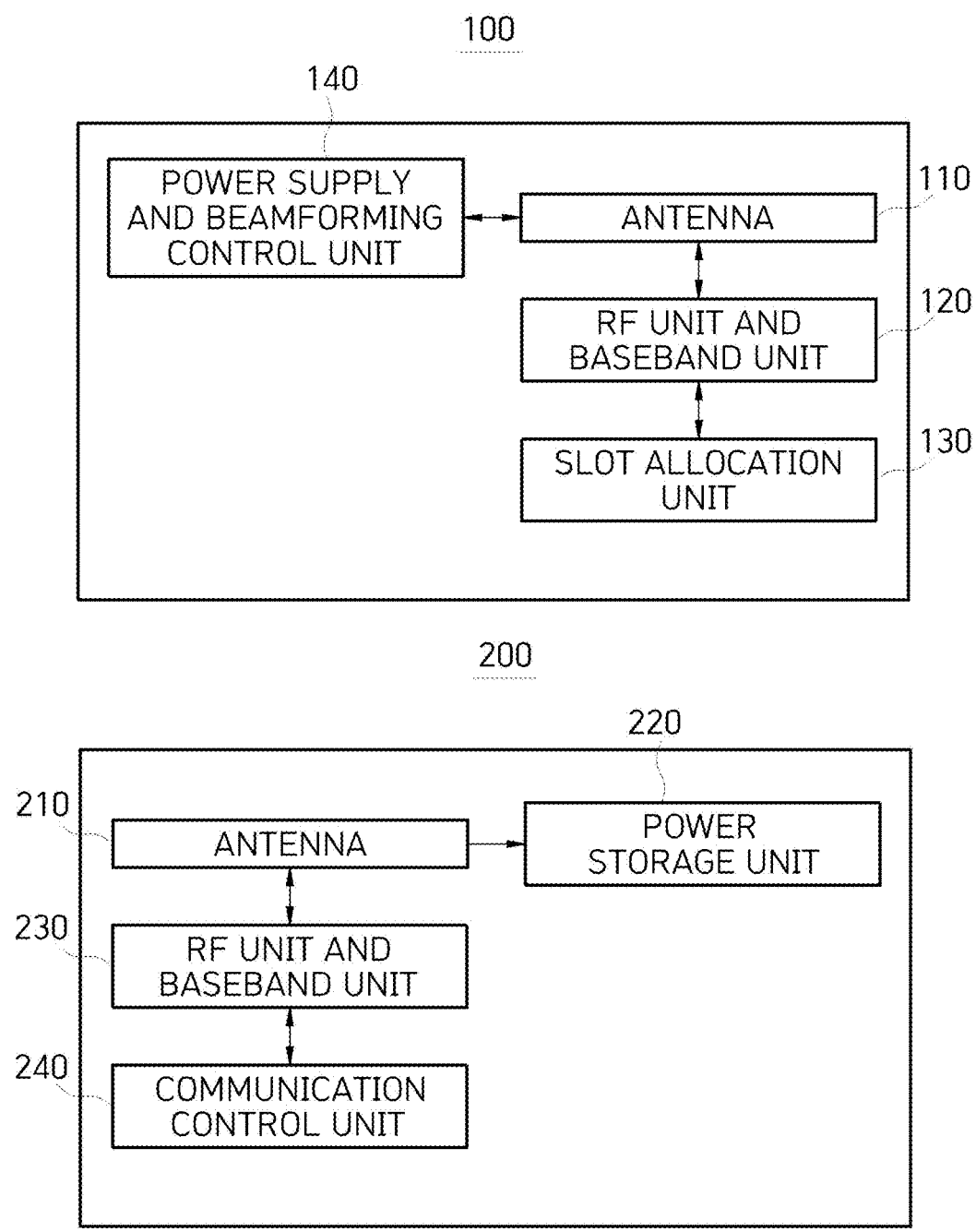
FIG. 15 is a block diagram illustrating a configuration of a wireless power transfer system according to an embodiment of the described technology.
Figure 16:
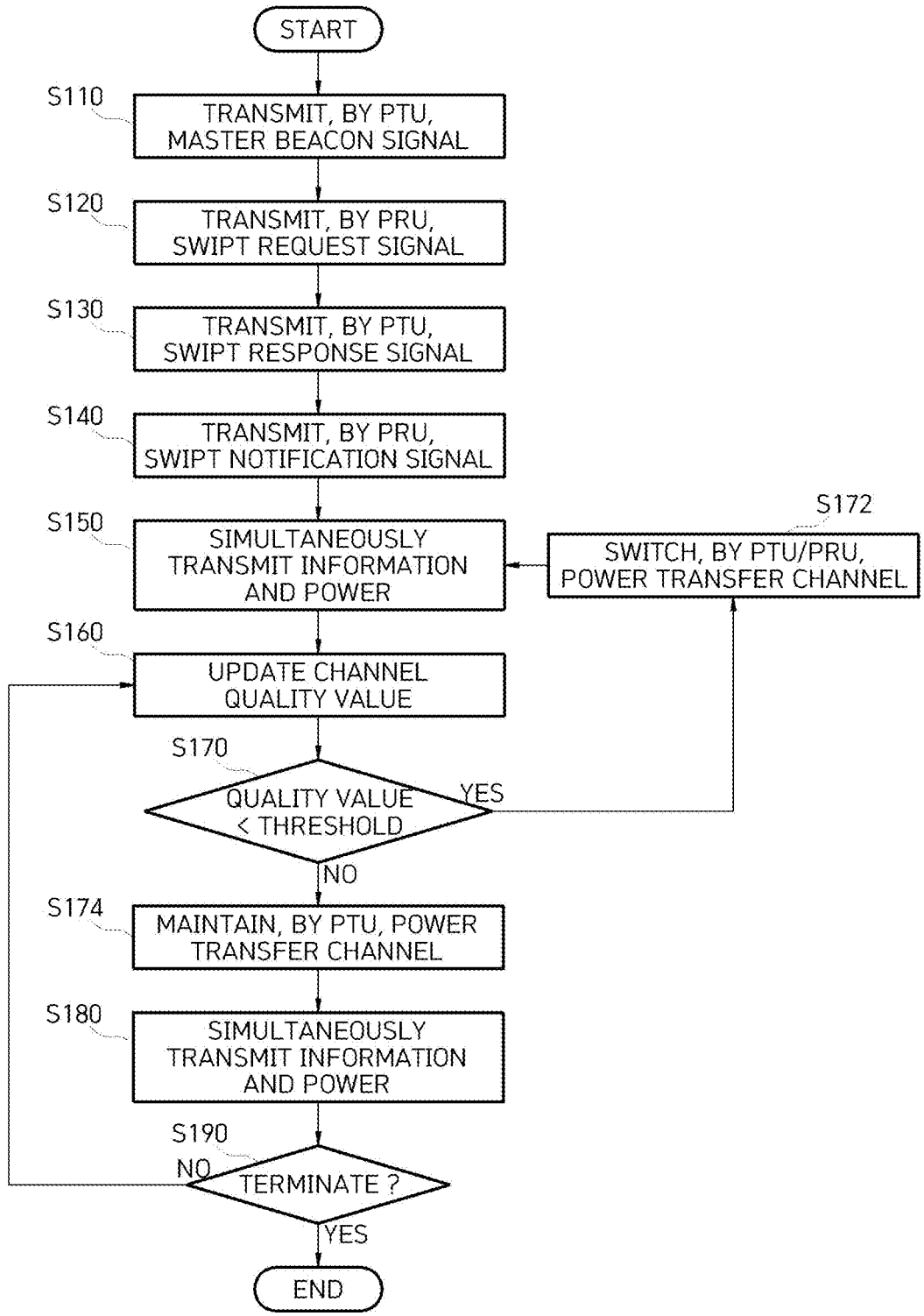
FIG. 16 is a flowchart showing a wireless power transfer method according to an embodiment of the described technology.

FIG. 15 is a diagram illustrating the configuration of a wireless cooperative charging system according to the described technology. For the sake of convenience of description and enhancement of understanding, only parts directly related to power transfer are illustrated.

A PTU 100 that transmits power includes an array antenna 110 including a plurality of antennas, a radio frequency (RF) unit and a baseband unit 120 provided for data transmission and reception, a slot allocation unit 130 configured to perform a DSME SWIPT GTS-handshaking during a CAP section to allocate a channel for power transfer and a channel for data transmission and perform channel reallocation for channel adaptation, and a power supply and beamforming control unit 140 configured to supply transmission power and adjust the array of antennas to beamform power in a direction in which a PRU having transmitted a PB is located, in which a PRU 200 receiving power includes an antenna 210, an RF unit and a baseband unit 230 for data transmission and reception, a communication control unit 240 configured to proceed with SWIPT GTS-handshaking for power transfer request and to generate a PB signal, and a power storage unit 220 configured to store received power.

In the embodiment illustrated in FIG. 15, the PTU 100 and the PRU 200 perform scheduling using the DSME scheme proposed by IEEE 802.15.4-2015. An MB signal transmitted by the PTU 100 according to the described technology is obtained by adding a new Header IE to the existing MB structure to form DSME-SWIPT PAN Coordination and defining a DSME-SWIPT PAN descriptor IE value in the Header IE. The PTU 100 transmits data for network synchronization and superframe structure data during an MB transmission period.

Based on the above-described data, the slot allocation unit 130 of the PTU 100 and the communication control unit 240 of the PRU 200 perform GTS-handshaking during the CAP section so that the slot allocation unit 130 allocates slots with which the PRU 200 receives power reception or transmits/receives data in a CFP section.

The CFP section is a section in which power and data are transmitted/received and which is divided into a plurality of channel offsets and a plurality of timeslots. That is, as shown in FIGS. 2 to 4, the CFP section includes a plurality of slots, and each slot is defined by a plurality of different channels (frequencies) and time-divided unit times. The PTU 100 and the PRU 200 transmit and receive power in a slot allocated for power transfer, and the PTU 100 continuously monitors channel congestion and dynamically switches to a channel with a frequency having less congestion and transfers power.

The communication control unit 240 of the PRU 200, which has been assigned a WPT GTS, that is, a slot that ensures to receive power only by itself, transmits a PB informing the direction of the PRU 200 in the first slot of the GTS allocated to the PRU 200 for wireless power transfer.

The power supply and beamforming control unit 140 of the PTU 100 that has received the PB extracts position data from the PB and performs beamforming in the corresponding direction to transfer power to the PRU 200 that has transmitted the PB. During the CFP section, each PRU 200 transmits/receives data or receives power using slots allocated thereto.

The slot allocation unit 130 of the PTU 100 checks the link quality of the channel through a DSME Link report command during the CAP section to dynamically switch and allocate the channel of the GTS for wireless power transfer.

The DSME Link Report command for determining the link quality includes data, such as Channel, AvgLQI, and AvgRSSI, and each data value is included in a SWIPT-DSME MAC command.

For channel adaptation, the slot allocation unit 130 of the PTU 100 and the communication control unit 240 of the PRU 200 maintain and update a power transfer channel list, which is data of channels (frequencies) desired by each of the PTU 100 and the PRU 200, and share details of the power transfer channel list during the CAP section.

The communication control unit 240 of the PRU 200 transmits a PB in the first slot of the CFP or the first slot of the GTSs allocated for WPT to inform the PTU 100 of the location of the PRU 200.

Because the CAP section is a contention section having a risk of collision in a process of each of the PRUs 200 joining the network and transmitting details of whether data to be transmitted exists to the PTU 100, each of the PRUs 200 communicates based on CSMA in the CAP section.

In addition, for cooperative charging, when at least one other PTU exists near the parent PTU, the at least one other PTU transmits a beacon, and the PRU 200 receives the beacon, the communication control unit 240 of the PRU 200 transmits a cooperative charging request command according to the method described above. The cooperative charging request command includes GTS information allocated through the GTS handshaking with the Parent PTU.

Upon receiving the cooperative charging request command, a slot allocation unit 130 of the at least one other nearby PTU refers to the GTS information included in the cooperative charging request command, transmits a cooperative charging response message for cooperative charging approval when the same slot as the GTS information is available, and broadcasts a notification command including details of cooperative charging approval. As another embodiment, the PRU, which has received the cooperative charging response message, broadcasts the notification command.

When the at least one other PTU is available for some slots of the GTS included in the cooperative charging request command, the slot allocation unit 130 of the at least one other PTU sets to partially allocate only the available slots and also transmits a response message for cooperation approval. The PRU or the PTU broadcasts a notification command including details of the cooperation approval.

On the contrary, when the at least one other PTU is not available for slots corresponding to the GTS included in the cooperative charging request command, the slot allocation unit 130 of the at least one other PTU transmits a response message for cooperation rejection. The PRU or the PTU broadcasts a notification command including details of the cooperation rejection.

The power supply and beamforming control units 140 of the parent PTU and the at least one other PTUs approved for cooperative charging transmit power to the PRU having requested charging in a beamforming method in cooperation with each other in all or part of the slots of the GTS.

An embodiment of a wireless cooperative charging method according to the described technology will be described with reference to FIG. 16.

PTU #1 serving as a PAN coordinator transmits an MB signal that reaches a predetermined area (S110).

The MB signal includes SWIPT mode data (1 for a fixed mode and 2 for a negotiated mode), maximum transmission power determined according to the SWIPT mode, a power transfer channel list ID (marked as 0 when using all 16 channels for power transfer and marked as 1 when using a channel determined by a PAN coordinator, that is, a PTU #1), and a list of power transfer channels to be used for power transfer (in one embodiment, a part of 16 channels in the Industrial, Scientific and Medical band (ISM) band).

When PRU #2 within the predetermined area receives the MB signal, the PRU #2 transmits a SWIPT request signal to PTU #1 in the CAP section (S120).

The SWIPT request signal includes a GTS type (0 for a slot request for data transmission and 1 for a slot request for power transfer), the length of the power transfer channel list, the power transfer channel list (in one embodiment, sorted in the descending order according to the channel quality, that is, having a higher quality channel located on an upper side), a quality threshold (a link quality threshold for channel adaptation), details indicating whether to charge cooperatively (1 when desiring to receive power from more than two PTUs), and a WPT time offset (a Time Offset value for setting the WPT start point according to the distance estimated through MB reception, that is, a value for phase synchronization of power transferred from multiple PTUs during cooperative charging).

Upon receiving the SWIPT request signal, PTU #1 transmits a SWIPT response signal that acknowledges the receipt to each PRU having transmitted the request signal in consideration of the request signals of the at least one PRU and the channel state (S130).

The SWIPT response signal, similar to the SWIPT request signal, includes a GTS type (0 for a slot request for data transmission and 1 for a slot request for power transfer), the length of the power transfer channel list, the power transfer channel list (in one embodiment, sorted in a descending order according to the channel quality, having a higher quality channel located at an upper side), a quality threshold (a link quality threshold for channel adaptation), details indicating whether to charge cooperatively (1 when desiring to receive power from more than two PTUs), and a WPT time offset (a Time Offset value for setting the WPT start point according to the distance estimated through MB reception, that is, a value for phase synchronization of power transferred from multiple PTUs during cooperative charging), but in consideration of details of the request of other PRUs and the channel state, PTU #1 may transmit a value different from each field value of the request signal. Upon receiving the SWIPT response signal, PRU #2 broadcasts a SWIPT notification signal finally confirming that PRU #2 has joined the SWIPT system to the PTU and other PRUs. Details of fields involved with SWIPT are the same as those of the SWIPT response. With such a process, data and power are simultaneously transmitted and received in the CFP section, which is a contention-free period in which the concern of collision is removed.

In detail, the PRU that desires to receive power transmits a PB in the first slot of the GTS. The PB includes phase data indicating the location of the PRU that is desired to receive power. The PTU receives data of the PB and extracts the phase of the signal incident from each transmission antenna or performs a position recognition algorithm (such as, a MUSIC algorithm) to identify the location of the PRU, that is, the location to which power is beamformed.

Power transfer is performed on the channel and slot allocated to the PRU through the above-described processes. The PTU does not transfer power unless the PB is received in a slot of number 0 of the CFP, that is, the first slot of the GTS. In this way, when an obstacle is located between the PTU and the PRU, power transfer is stopped, thereby preventing useless power transfer or preventing the person located between the PTU and the PRU from being harmed due to power transfer.

In order to more precisely identify obstacles and control power transfer, as another embodiment, the PRU may continuously transmit the PBs during the GTS section allocated to receive power, and the PTU in response to receiving no PB, may stop transmitting power even within the allocated slot time. With such a configuration, for example, even when a person rapidly passes through between the PRU and the PTU during the CFP section, power transfer may be immediately stopped, thereby further minimizing the harm to the person.

After power transfer and/or data transmission are performed for a predetermined CFP section, the operation enters a CAP section to update the power transfer channel quality values of all PTUs and PRUs (S160).

The PTU switches or maintains the wireless power transfer channel on the basis of the updated channel quality value. That is, the PTU determines whether the updated channel quality value is less than the above-described quality threshold (S170) and, in response to the updated channel quality value being less than the quality threshold, switches the power transfer channel for the corresponding PRU (S172).

The switching of the channel may be performed by referring to the power transfer channel list in the previous SWIPT response signal previously transmitted and received so as to switch to a channel which has the highest quality (or a channel which had the highest quality), or referring to the current channel quality value updated in the CAP section so as to switch to a channel having the highest quality.

The switching of the channel is determined and set by the PTU by default, but since the PRU and the PTU share the updated link quality status data, the PRU may be configured to make a request by altering the power transfer channel in the SWIPT request signal into a good quality channel in the CAP section, and the PTU may be configured to switch the channel in response to the request or with reference to the request.

In addition, even when power is being transferred in the CFP section, the channel quality may be continuously detected so that channel switching is performed.

When it is determined as a result of determining the channel state that the updated channel quality value is greater than or equal to the above-described quality threshold, the PTU maintains the power transfer channel and transmits power (S174). In the period, each of PRU and/or PTU may also transmit and receive data. When the transmission of all data and power is completed, the operation is terminated, and otherwise, the above-described processes are repeated.

Meanwhile, other PTUs near PTU #1, which is the parent PTU, may transmit beacons. The beacons transmitted by other PTUs are beacon signals different from the MB transmitted by the parent PTU. In this case, the cooperative charging according to the described technology is performable and will be described in detail below. In a real situation, since each PTU may transmit a respective beacon, PRU #2 may receive beacons and receive power from three or more PTUs, but for the sake of convenience of description and enhancement of understanding, the following description will be made based on cooperation of PTU #1 and PTU #2.

Immediately after allocation of GTSs is performed between PTU #1 and PRU #2 or at a certain point in time in which wireless power transfer is in progress between PTU #1 and PRU #2, PTU #2 may transmit a beacon (S140).

When PRU #2 receives the beacon signal of PTU #2, PRU #2 may request cooperative charging to PTU #2 through a cooperative charging request command (S150). In this case, the cooperative charging request command includes a SAB sub-block containing GTS information allocated during a GTS handshaking process with the parent PTU, that is, PTU #1.

Upon receiving the cooperative charging request command, the PTU #2 determines whether a slot corresponding to the previously allocated GTS or a slot corresponding to a part of the previously allocated GTS is available (S170), and when the slot is available, PTU #2 transmits a cooperative charging approval command (Cooperative Charging Mode=1) representing an approval to PRU #2 (S171), and PTU #1 and PTU #2 transmit power to PRU #2 in cooperation with each other (S180).

When PTU #2 is not available for a slot corresponding to the previously allocated GTS, PTU #2 transmits a cooperative charging approval command (Cooperative Charging Mode=0) representing a rejection to PRU #2 (S172), and in this case, only PTU #1 transfers power to PRU #2 (S190).

Embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although the described technology has been described in detail above with reference to embodiments, it should be understood that the disclosed embodiments are not limiting but illustrative in all aspects and various modifications and alterations may be made without departing from the technical spirit or essential features of the described technology. Therefore, the scope of the described technology is defined not by the above description but by the following claims.

What is claimed is:

1. A Simultaneous Wireless Information and Power Transfer (SWIPT) power transfer system comprising:
   an array antenna including a plurality of antennas;
   a radio frequency (RF) unit and a baseband unit provided for data transmission and reception;
   a slot allocation unit configured to allocate a channel for power transfer and a slot for data transmission in a Contention Access Period (CAP) section and allocate a slot for power transfer in consideration of whether to perform cooperative charging with a nearby another SWIPT power transfer system; and
   a power supply and beamforming control unit configured to adjust the array antenna such that a power signal to be transmitted is beamformed according to a positioning beacon from a power receiving unit (PRU).

2. The system of claim 1, wherein the slot allocation unit transmits a master beacon signal in the CAP section, and the master beacon signal is a signal obtained by adding a new Header information element (IE) to an existing master beacon structure for formation of Distributed Synchronous Multichannel Extension (DSME)-SWIPT personal area network (PAN) coordination and defining a DSME-SWIPT PAN descriptor IE value in the Header IE.

3. The system of claim 1, wherein the slot allocation unit performs a Guaranteed Time Slot (GTS)-handshaking with the PRU during the CAP section to allocate the slot for power transfer and the slot for data transmission in a Contention Free Period (CFP) section, and
the CFP section is a section including a plurality of time slots divided by different frequencies and times to allow simultaneous transmission of power and data.

4. The system of claim 1, wherein the slot allocation unit, in response to receiving a cooperative charging request command from the PRU, determines whether to approve cooperative charging and transmits a cooperative charging response command including a result of the determination.

5. The system of claim 4, wherein the cooperative charging request command includes Guaranteed Time Slot (GTS) information previously allocated to the PRU.

6. The system of claim 1, wherein the power supply and beamforming control unit, in response to the positioning beacon being received from at least one of a first slot of a Contention Free Period (CFP) section and a first slot among GTSs allocated for wireless power transfer, adjusts the array antenna on the basis of a transmission direction of the positioning beacon to transmit power in a beamforming method to a side from which the positioning beacon is received.

7. The system of claim 1, wherein the slot allocation unit identifies a link quality of the channel in the CAP section to dynamically switch and allocate the channel of a GTS for wireless power transfer.

8. The system of claim 1, wherein the slot allocation unit maintains and updates a transmission channel list for channel adaptation and shares information about the transmission channel list with a power reception system during the CAP section.

9. The SWIPT system of claim 1, wherein the slot allocation unit conforms to a Distributed Synchronous Multichannel Extension (DSME) scheme specified in IEEE 802.15.4-2015 and improves the DSME method to schedule a time slot in a Contention Free Period (CFP) section.

10. A Simultaneous Wireless Information and Power Transfer (SWIPT) power reception system comprising:
an antenna configured to receive at least one of data and power;
a radio frequency (RF) unit and a base band unit provided for data transmission and reception;
a communication control unit configured to proceed with Distributed Synchronous Multichannel Extension Simultaneous Wireless Information and Power Transfer Guaranteed Time Slot (DSME SWIPT GTS)-handshaking, generate a Positioning Beacon (PB) signal for requesting power, and request cooperative charging; and
a power storage unit configured to store the received power.

11. The system of claim 10, wherein the communication control unit, in response to receiving a beacon signal from a power transmitting unit (PTU) different from a PTU having performed the GTS handshaking, transmits a cooperative charging request command including GTS information allocated through the GTS-handshaking to the different PTU.

12. A Simultaneous Wireless Information and Power Transfer (SWIPT) power transfer method comprising:
transmitting, by a power transfer system, a master beacon signal that reaches a predetermined area;
initiating, in response to a power reception system within the predetermined area receiving the master beacon signal, SWIPT Guaranteed Time Slot (GTS)-handshaking;
allocating respective GTSs for transmitting power and data while proceeding with the handshaking;
performing power transfer and reception in the allocated GTS;
requesting, in response to the power reception system receiving a beacon signal different from the master beacon signal, a cooperative charging request command;
determining, by a different power transfer system having received the cooperative charging request command, whether to perform cooperative charging; and
when the cooperative charging is performable, transferring power by the transfer system and the different transfer system in cooperation with each other.

13. The method of claim 12, wherein the allocating of the slot includes:
transmitting, by the power reception system, a SWIPT request signal;
allocating, by the power transfer system having received the SWIPT request signal, a slot usable by each of the power transfer systems in consideration of one or more of the SWIPT request signal and a channel status, and transmitting a SWIPT response signal including data regarding the allocation; and
broadcasting a SWIPT notification signal confirming that the power reception system having received the SWIPT response signal has joined a SWIPT system.

14. The method of claim 12, wherein the transmitting of the cooperative charging request command includes transmitting the cooperative charging request command in which information about the allocated GTS is included.

15. The method of claim 12, wherein the determining whether to perform cooperative charging includes determining, by the different power transfer system, whether at least a part of a time slot corresponding to the received cooperative charging request command is available.

* * * * *